United States Patent [19]
Ito et al.

[11] Patent Number: 5,541,768
[45] Date of Patent: * Jul. 30, 1996

[54] VARIABLE POWER VIEW FINDER HAVING ASPHERIC LENS SURFACES

[75] Inventors: Takayuki Ito; Sachio Hasushita, both of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,410,430.

[21] Appl. No.: 356,623

[22] Filed: Dec. 15, 1994

Related U.S. Application Data

[63] Continuation of Ser. No. 981,544, Nov. 25, 1992, Pat. No. 5,410,430.

[30] Foreign Application Priority Data

| Nov. 25, 1991 | [JP] | Japan | 3-355423 |
| Nov. 25, 1991 | [JP] | Japan | 3-355424 |
| Aug. 26, 1992 | [JP] | Japan | 4-227567 |
| Aug. 26, 1992 | [JP] | Japan | 4-227568 |

[51] Int. Cl.⁶ ............................................. G02B 13/18
[52] U.S. Cl. .......................... 359/422; 359/432; 359/646; 359/717; 354/222
[58] Field of Search ........................... 354/222; 359/643, 359/646, 784, 793, 422, 432, 717

[56] References Cited

U.S. PATENT DOCUMENTS

| 3,778,133 | 12/1973 | Tatian . | |
| 4,109,995 | 7/1978 | Betensky . | |
| 4,212,526 | 7/1980 | Yamazaki et al. | 354/225 |
| 4,265,529 | 5/1981 | Yokota | 359/646 |
| 4,427,268 | 1/1984 | Ikemori . | |
| 4,592,636 | 6/1986 | Kato et al. | 354/225 |
| 4,614,409 | 9/1986 | Sakai . | |
| 4,725,130 | 2/1988 | Ozawa | 359/690 |
| 4,733,953 | 3/1988 | Yamamoto et al. . | |
| 4,779,969 | 10/1988 | Sato et al. | 359/442 |
| 4,812,023 | 3/1989 | Kikuchi | 359/689 |
| 4,842,395 | 6/1989 | Sato et al. | 359/380 |
| 4,854,680 | 8/1989 | Kikuchi | 359/689 |
| 4,909,614 | 3/1990 | Itoh et al. | 354/225 |
| 4,910,545 | 3/1990 | Fujibayashi et al. | 354/225 |
| 4,981,344 | 1/1991 | Ueda . | |
| 4,992,809 | 2/1991 | Nozaki et al. | 354/149.11 |
| 5,004,329 | 4/1991 | Tsuchida . | |
| 5,034,763 | 7/1991 | Inabata | 354/219 |
| 5,052,787 | 10/1991 | Sugawara | 359/683 |
| 5,086,353 | 2/1992 | Mukai et al. | 359/432 |
| 5,095,326 | 3/1992 | Nozaki et al. | 359/669 |
| 5,136,427 | 8/1992 | Sugawara | 359/646 |
| 5,166,830 | 11/1992 | Ishibai et al. | 359/717 |
| 5,235,460 | 8/1993 | Abe | 359/431 |
| 5,309,286 | 5/1994 | Abe et al. | 359/695 |
| 5,376,984 | 12/1994 | Abe | 354/219 |

FOREIGN PATENT DOCUMENTS

| 0105467 | 4/1984 | European Pat. Off. . |
| 0401862 | 12/1990 | European Pat. Off. . |
| 0473117 | 3/1992 | European Pat. Off. . |
| 61-156019 | 7/1986 | Japan . |
| 1257817 | 10/1993 | Japan . |
| 1522356 | 7/1978 | United Kingdom . |
| 1558833 | 1/1980 | United Kingdom . |
| 2227104 | 7/1990 | United Kingdom . |
| 2241351 | 8/1991 | United Kingdom . |
| 2260202 | 4/1993 | United Kingdom . |
| 2261529 | 5/1993 | United Kingdom . |
| 2262164 | 6/1993 | United Kingdom . |
| 2263345 | 7/1993 | United Kingdom . |
| 9309458 | 5/1993 | WIPO . |

*Primary Examiner*—William L. Sikes
*Assistant Examiner*—Hung Xuan Dang
*Attorney, Agent, or Firm*—Greenblum & Bernstein, P.L.C.

[57] ABSTRACT

A real image type of variable power view finder is disclosed which has an objective lens system, an image erecting optical system, and an eyepiece lens system, located in this order as viewed from an object to be photographed. The objective lens system includes negative and positive lens groups located in this order from the object side, so as to vary the distance therebetween, to change the magnification. The negative lens group of the objective lens system has at least two negative lenses.

4 Claims, 32 Drawing Sheets

E.R= 3.0°

— d line
····· g line
--- c line

-0.5  0.5

SPHERICAL ABERRATION
CHROMATIC ABERRATION

ω=13°

-0.1  0.1

CHROMATIC ABERRATION
OF MAGNIFICATION

ω=13°

— S
--- M

-1.0  1.0

ASTIGMATISM

ω=13°

-5.0  5.0%

DISTORTION

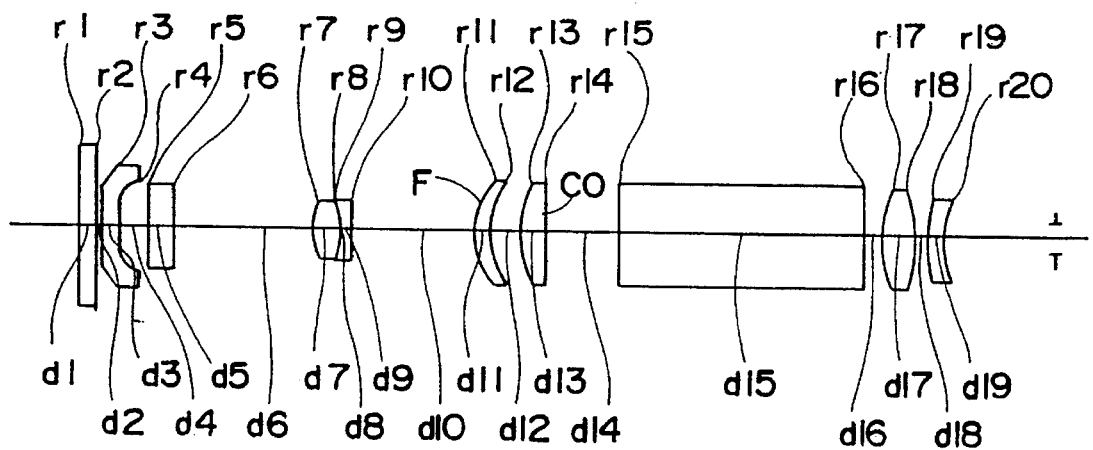
Fig-3
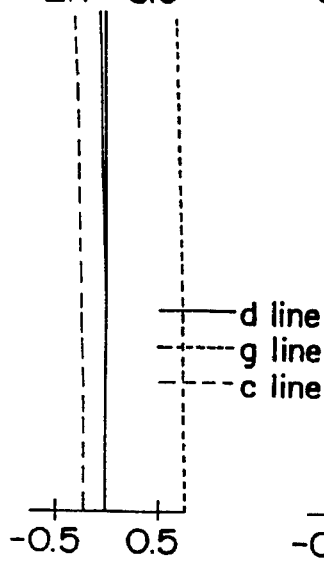
Fig-4A
ER=3.0°
-0.5  0.5
SPHERICAL ABERRATION
CHROMATIC ABERRATION
— d line
----- g line
--- c line
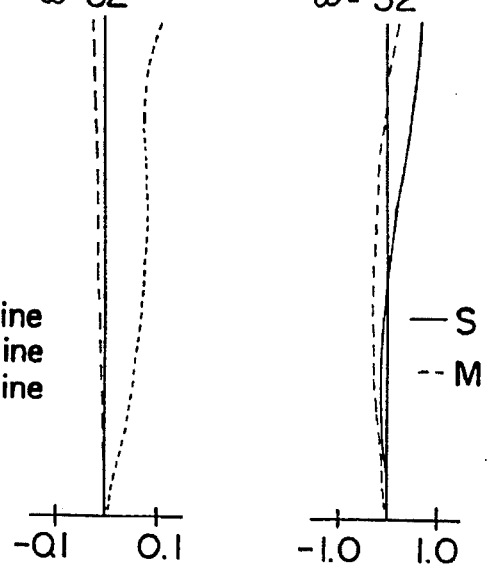
Fig-4B
ω=32°
-0.1  0.1
CHROMATIC ABERRATION
OF MAGNIFICATION
Fig-4C
ω=32°
—S
--M
-1.0  1.0
ASTIGMATISM
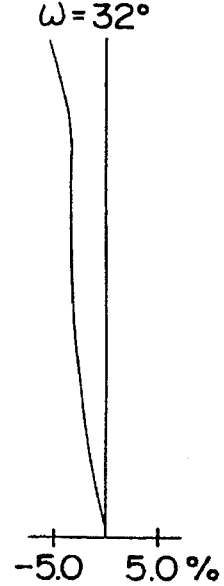
Fig-4D
ω=32°
-5.0  5.0 %
DISTORTION

E.R=3.0°

—— d line
------ g line
--- c line

-0.5  0.5

SPHERICAL ABERRATION
CHROMATIC ABERRATION

ω=13°

-0.1  0.1

CHROMATIC ABERRATION
OF MAGNIFICATION

ω=13°

—S
--M

-1.0  1.0

ASTIGMATISM

ω=13°

-5.0  5.0%

DISTORTION

E.R=30°

—— d line
······ g line
– – c line

-0.5  0.5

SPHERICAL ABERRATION
CHROMATIC ABERRATION

ω=32°

-0.1  0.1

CHROMATIC ABERRATION
OF MAGNIFICATION

ω=32°

— S
– – M

-1.0  1.0

ASTIGMATISM

ω=32°

-5.0  5.0 %

DISTORTION

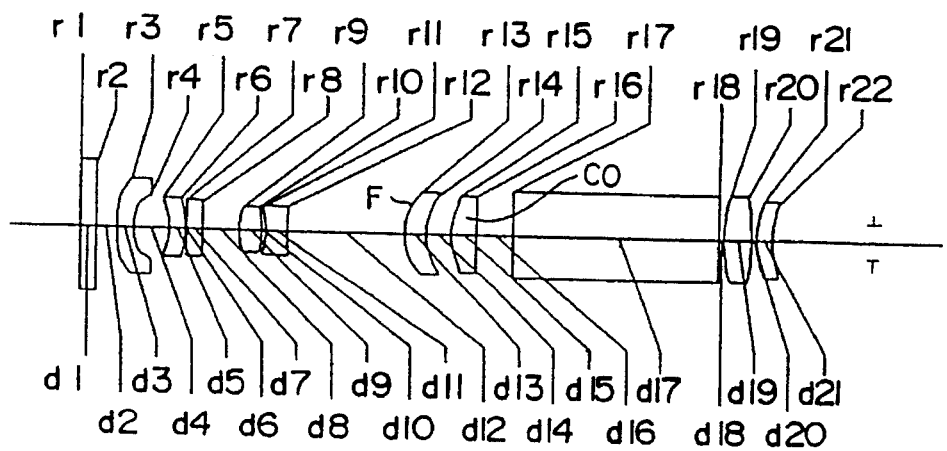
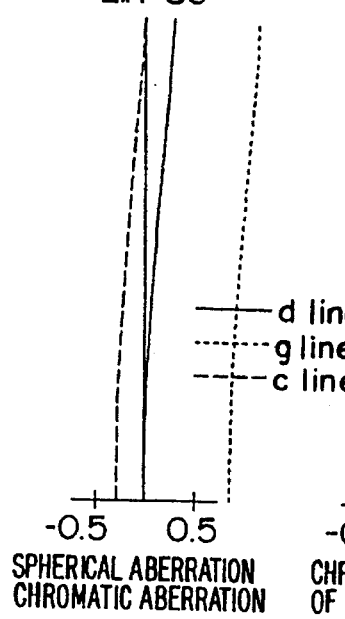 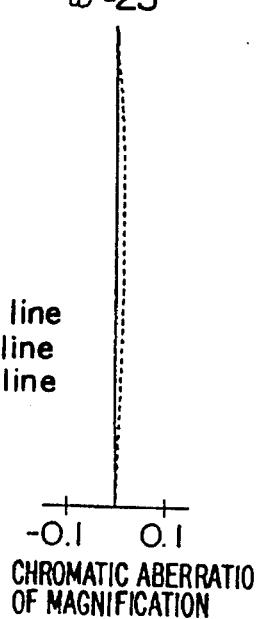 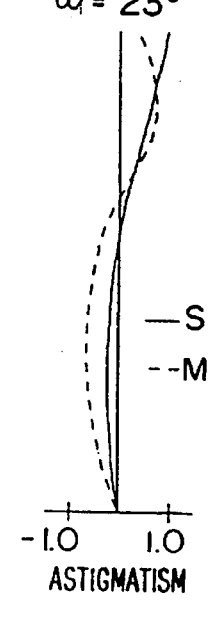 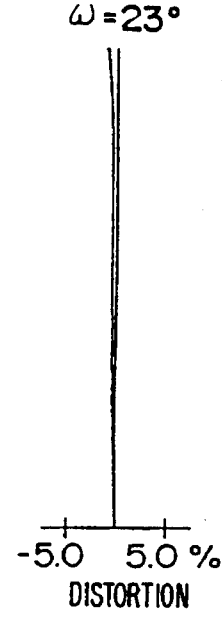

E.R.=3.0

—— d line
····· g line
– – c line

-0.5  0.5

SPHERICAL ABERRATION
CHROMATIC ABERRATION

ω=31°

-0.1  0.1

CHROMATIC ABERRATION
OF MAGNIFICATION

ω=31°

—— S
– – M

-1.0  1.0

ASTIGMATISM

ω=31°

-5.0  5.0 %

DISTORTION

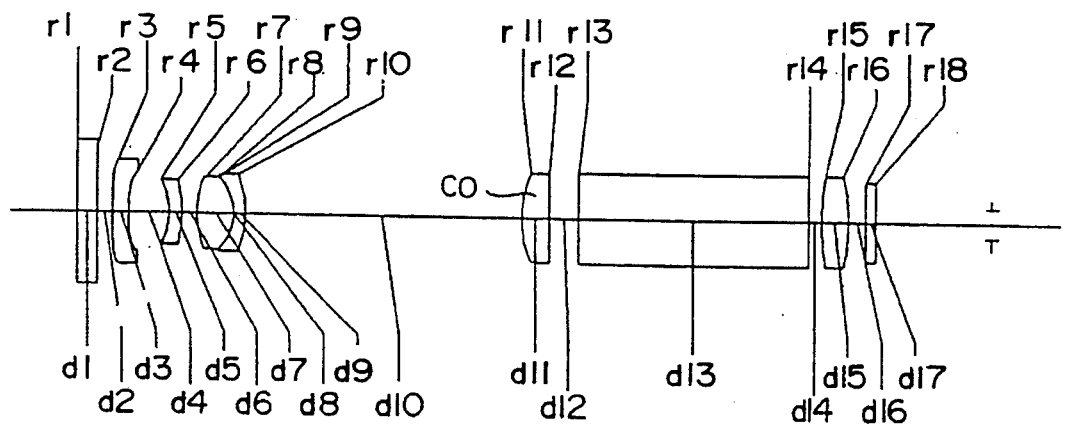
Fig-13
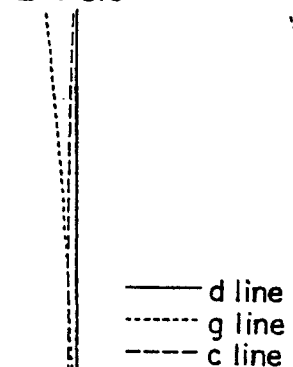
Fig-14A
E.R=3.0
— d line
······ g line
--- c line
-0.5  0.5
SPHERICAL ABERRATION
CHROMATIC ABERRATION
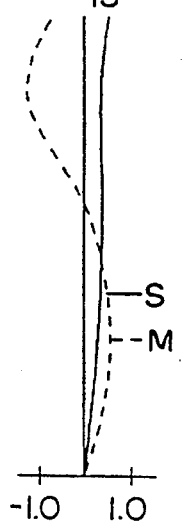
Fig-14B
ω=13°
-0.1  0.1
CHROMATIC ABERRATION
OF MAGNIFICATION
Fig-14C
ω=13°
—S
--M
-1.0  1.0
ASTIGMATISM
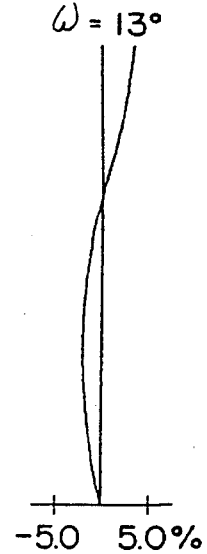
Fig-14D
ω=13°
-5.0  5.0%
DISTORTION

E.R=30

—— d line
······ g line
--- c line

-0.5   0.5

SPHERICAL ABERRATION
CHROMATIC ABERRATION

ω=32°

-0.1   0.1

CHROMATIC ABERRATION
OF MAGNIFICATION

ω=32°

—— S
--- M

-1.0   1.0

ASTIGMATISM

ω=32°

-5.0   5.0 %

DISTORTION

E.R=3.0
—— d line
······ g line
--- c line
-0.5  0.5

SPHERICAL ABERRATION
CHROMATIC ABERRATION
CHROMATIC ABERRATION

ω=13°
-0.1  0.1

CHROMATIC ABERRATION
OF MAGNIFICATION
OF MAGNIFICATION

ω=13°
— S
-- M
-1.00  1.00

ASTIGMATISM

ω=13°
-5.0  5.0%

DISTORTION

SPHERICAL ABERRATION
CHROMATIC ABERRATION

CHROMATIC ABERRATION
OF MAGNIFICATION

ASTIGMATISM

DISTORTION

Fig- 21
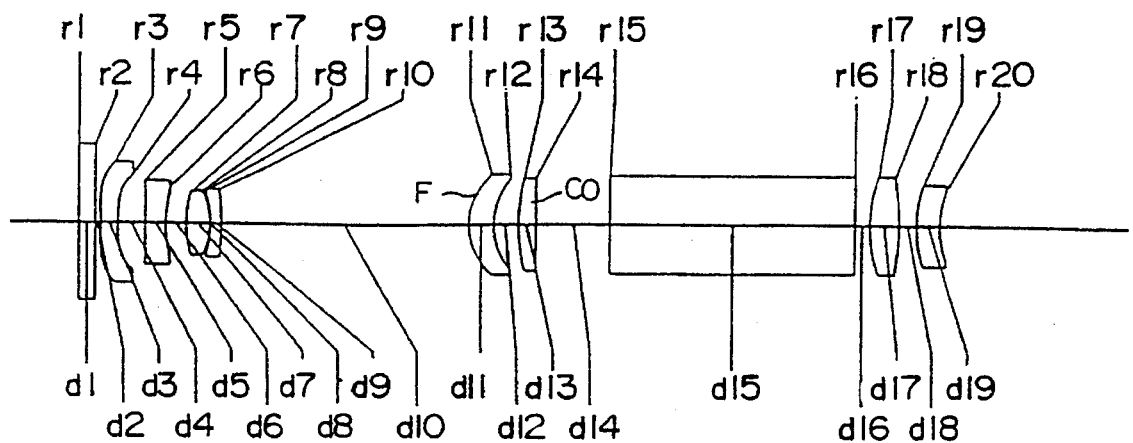
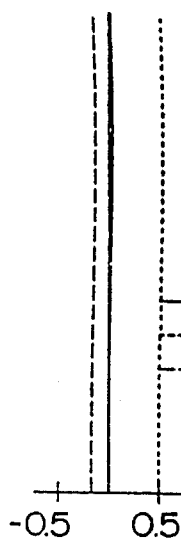
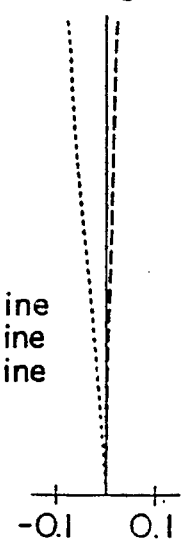
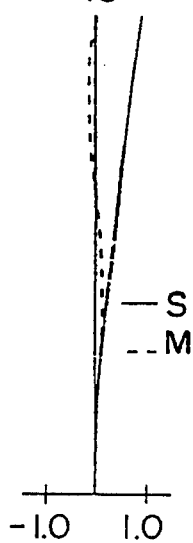
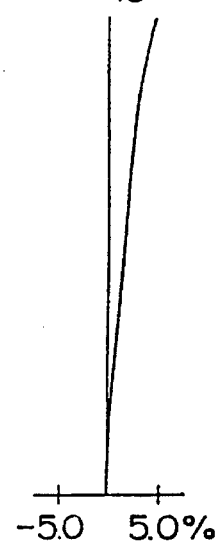
SPHERICAL ABERRATION
CHROMATIC ABERRATION
CHROMATIC ABERRATION OF MAGNIFICATION
ASTIGMATISM
DISTORTION

E.R = 3.0°

—— d line
······ g line
- - - c line

-0.5  0.5

SPHERICAL ABERRATION
CHROMATIC ABERRATION

ω=32°

-0.1  0.1

CHROMATIC ABERRATION
OF MAGNIFICATION

ω=32°

—— S
- - M

-1.0  1.0

ASTIGMATISM

ω=32°

-5.0  5.0 %

DISTORTION

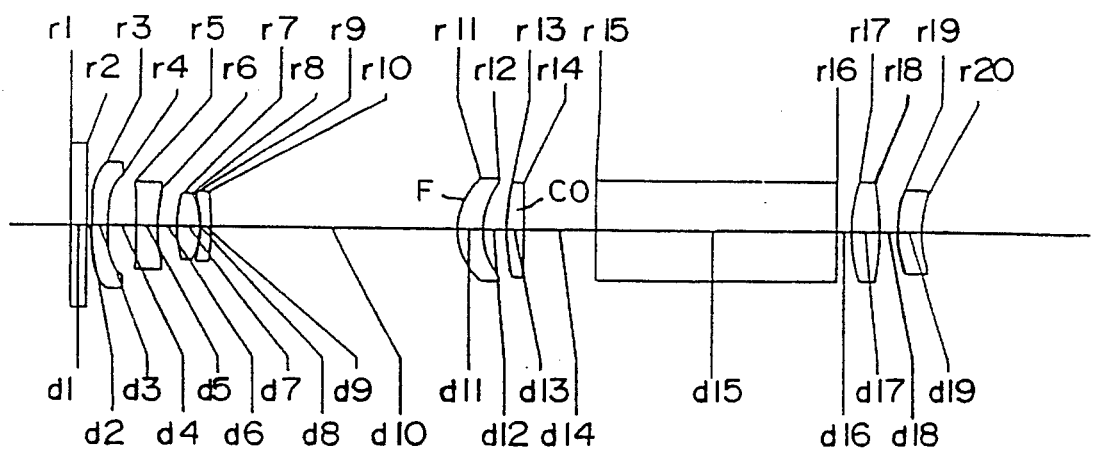
Fig. 29
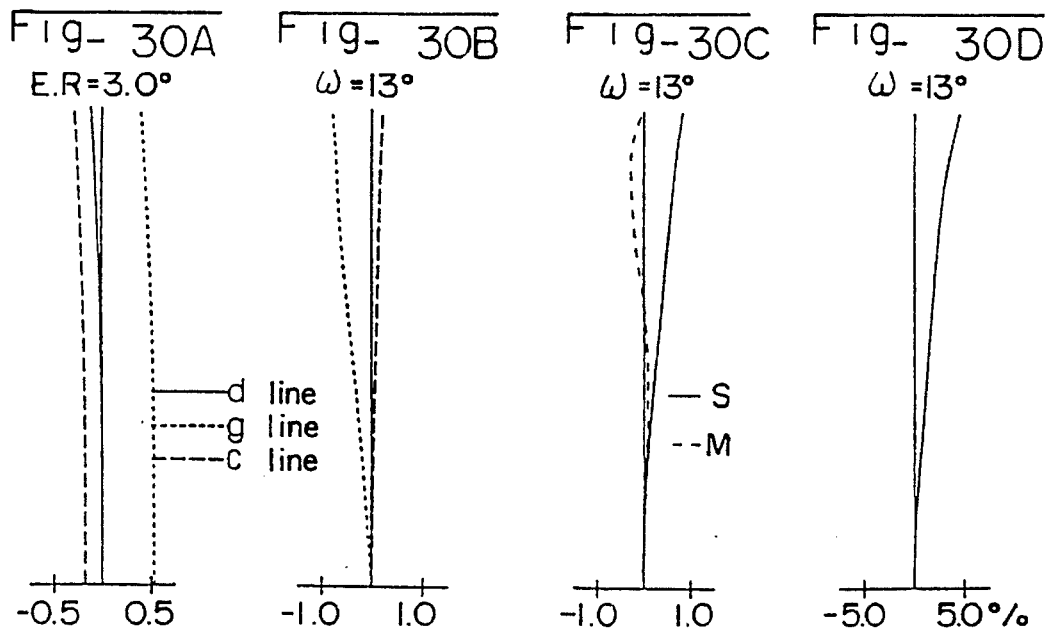
Fig. 30A  E.R=3.0°
Fig. 30B  ω=13°
Fig. 30C  ω=13°
Fig. 30D  ω=13°
— d line
······ g line
--- c line
— S
--- M
SPHERICAL ABERRATION
CHROMATIC ABERRATION
CHROMATIC ABERRATION
OF MAGNIFICATION
ASTIGMATISM
DISTORTION

SPHERICAL ABERRATION
CHROMATIC ABERRATION

CHROMATIC ABERRATION
OF MAGNIFICATION

ASTIGMATISM

DISTORTION

SPHERICAL ABERRATION
CHROMATIC ABERRATION

CHROMATIC ABERRATION
OF MAGNIFICATION

ASTIGMATISM

DISTORTION

E.R=3.0  ω=33°  ω=33°  ω=33°

SPHERICAL ABERRATION
CHROMATIC ABERRATION

CHROMATIC ABERRATION
OF MAGNIFICATION

ASTIGMATISM

DISTORTION

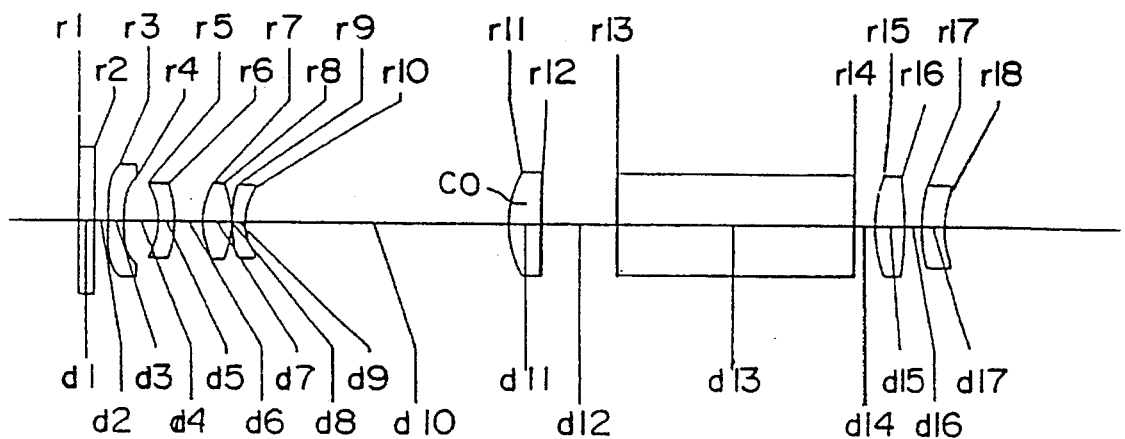
Fig-41
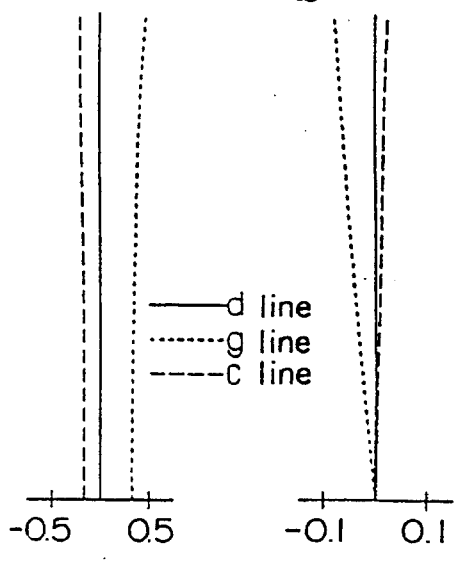
Fig-42A   Fig-42B
Fig-42C
Fig-42D
SPHERICAL ABERRATION
CHROMATIC ABERRATION
CHROMATIC ABERRATION
OF MAGNIFICATION
ASTIGMATISM
DISTORTION Fig- 43
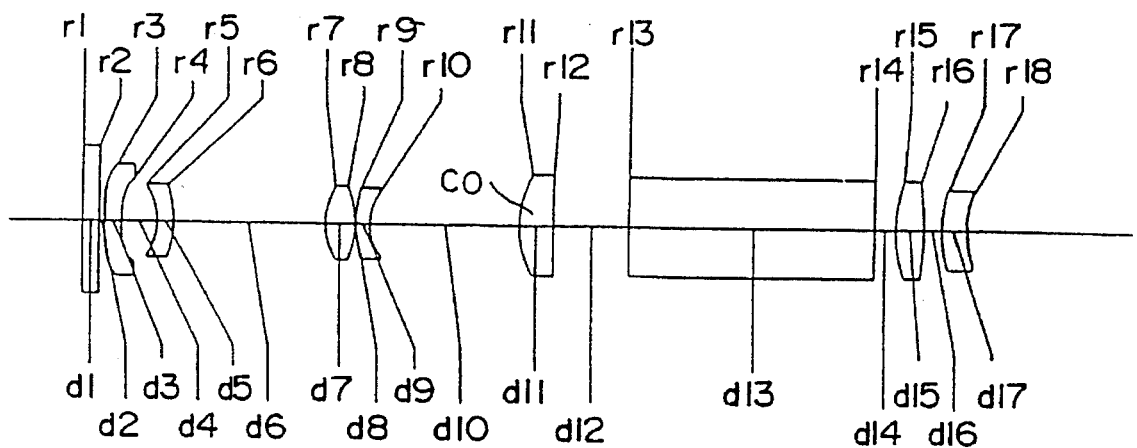
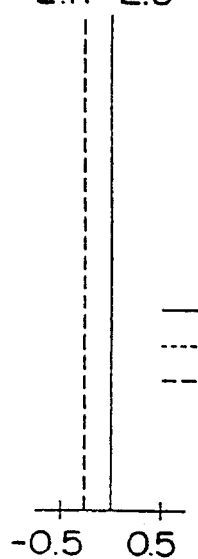
Fig-44A
E.R=2.5°
— d line
······ g line
--- C line
-0.5  0.5
SPHERICAL ABERRATION
CHROMATIC ABERRATION
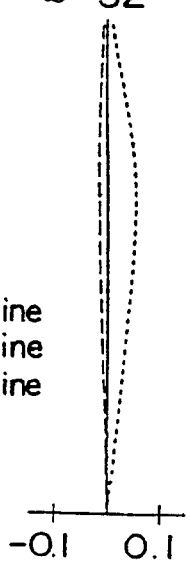
Fig-44B
ω=32°
-0.1  0.1
CHROMATIC ABERRATION
OF MAGNIFICATION
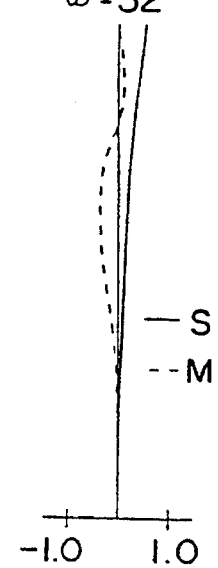
Fig-44C
ω=32°
— S
-- M
-1.0  1.0
ASTIGMATISM
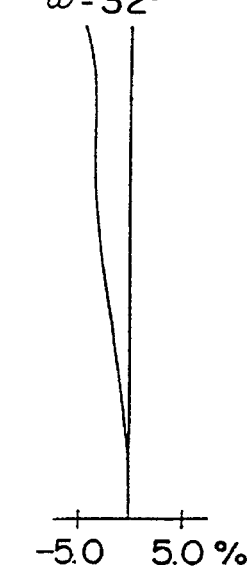
Fig-44D
ω=32°
-5.0  5.0 %
DISTORTION

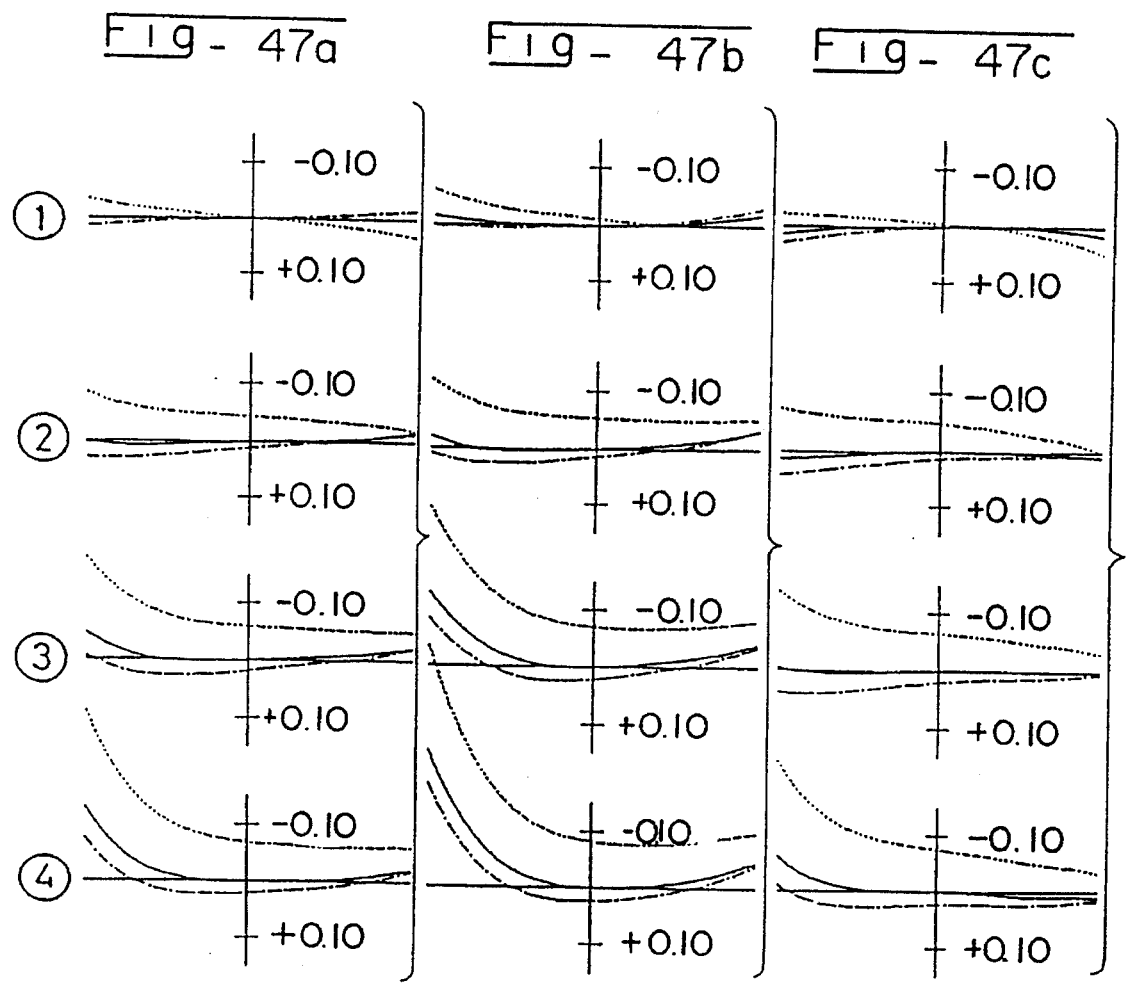

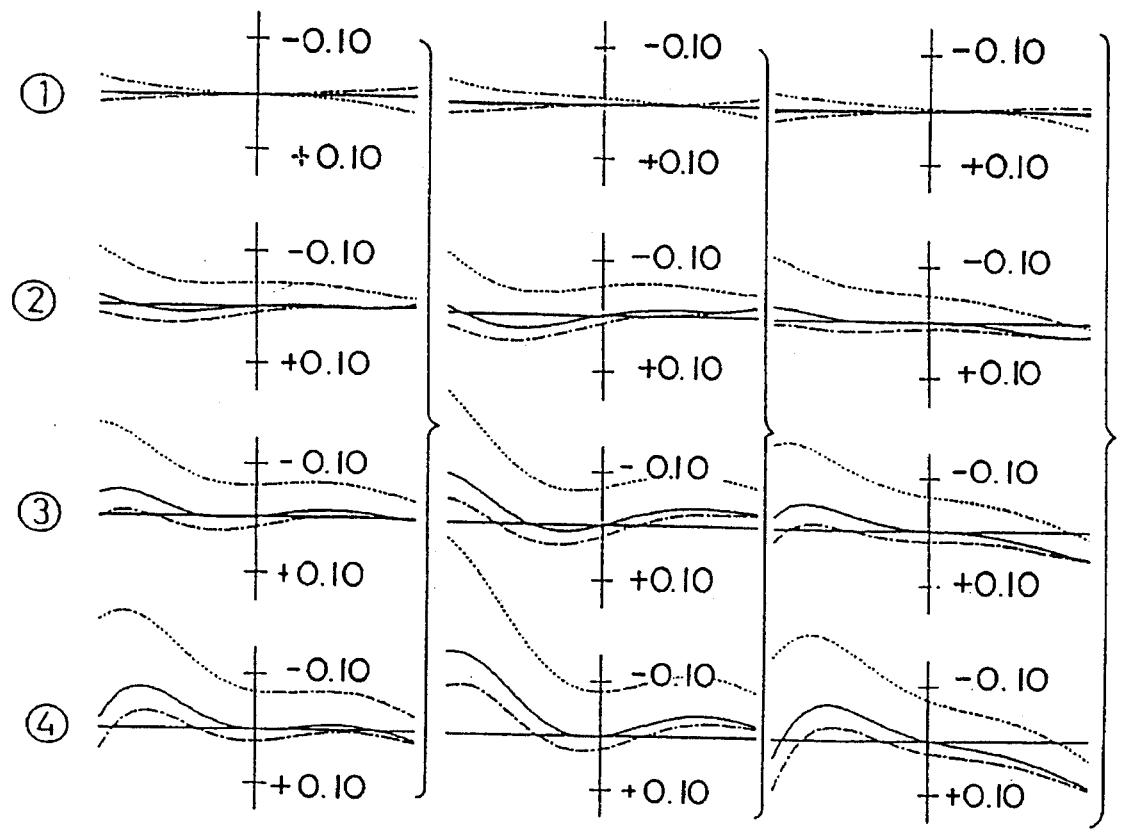

VARIABLE POWER VIEW FINDER HAVING ASPHERIC LENS SURFACES

This application is a continuation of application No. 07/981,544, filed Nov. 25, 1992, now U.S. Pat. No. 5,410,430.

BACKGROUND OF THE INVENTION

1. Field of the Invention

The present invention relates to a real image type of variable power view finder that is used, for example, in a compact camera. More precisely, the invention relates to an objective lens optical system of the viewfinder located on the side of the system that is close to an object to be photographed, an eyepiece optical system located on the side of the system close to a photographer's eye, and an aspheric lens system in which deterioration of image quality will not occur if an assembly error occurs, such as an eccentric arrangement of the lens, for example.

2. Description of Related Art

A conventional real image type of variable power view finder is usually comprised of an objective lens system, a prism optical system for inverting an image, and an eyepiece lens system. The objective lens system usually includes two lens groups; a negative lens group located close to an object to be photographed, and a positive lens group located close to a photographer's eye. The negative lens group is made of a single negative lens, and the eyepiece lens system is made of a single positive lens.

In a known image forming optical system, such as an objective lens system in a view finder or a picture taking optical system of a camera, an aspheric lens (lenses) has been used in the optical system to realize a simple and small camera, obtain a high image forming efficiency by using fewer lenses, and increase the magnification in case of a variable power optical system.

In a known real image type of variable power view finder, however, a half angle of view of the objective lens system on a short focal length side is 25°~27°. No larger half angle of view can be obtained.

In a known real image type of view finder in which the eyepiece lens system is made of a single positive lens, as mentioned above, it is necessary to set a long focal length of the eyepiece lens system in order to provide space for accommodating an image erecting optical system. Consequently, angular magnification of a view finder tends to become small, particularly in the case of a wide angle optical system.

It is theoretically possible to increase the angular magnification by shortening the focal length of the eyepiece lens system. This, however, reduces the distance between an object image formed by the objective lens system and the erecting optical system, making it impossible to provide a mechanism for moving a field frame, for example, upon taking a picture using a panoramic photographing function, in the space between the object image and the erecting optical system.

The use of an aspheric lens makes it possible to enhance the freedom of design, but remarkably deteriorates image forming efficiency in the event of an assembly error (mounting error), such as an eccentric arrangement (mounting) of the aspheric lens, or a manufacturing error thereof.

Two eccentric errors that occur in a lens are; lens surface eccentric error, in which a paraxial center of curvature of only one of the lens surfaces is deviated from a design optical axis of the associated optical system, as shown in FIG. 54a, and a lens eccentric error, in which paraxial centers of curvature of both the lens surfaces are deviated from a design optical axis of the associated optical system, as shown in FIG. 54b.

SUMMARY OF THE INVENTION

The primary object of the present invention is to provide a real image type of variable power view finder in which a large half angle of view on the short focal length side of an objective lens system can be obtained without increasing the size of the view finder.

Another object of the present invention is to provide a real image type of variable power view finder in which a large space for accommodating an image erecting optical system, can be obtained without decreasing the angular magnification of the view finder, and in which the distance between an object image formed by the objective lens system and the image erecting optical system can be increased.

Still another object of the present invention is to provide an aspheric lens system in which a high image forming efficiency can be obtained, even if there is an eccentric error upon mounting or assembling an associated optical system.

According to the present invention, there is provided a real image type of variable power view finder having an objective lens system, an image erecting optical system, and an eyepiece lens system, located in this order as viewed from an object to be photographed. The objective lens system includes a first lens group having a negative power and a second lens group having a positive power located in this order from the object side. The distance between the first and second lens groups is varied to change the magnification. The first lens group of the objective lens system includes at least two negative lens elements.

According to another aspect of the present invention, there is provided a real image type view finder having an objective lens system, an image erecting optical system, and an eyepiece lens system, located in this order as viewed from an object to be photographed. The eyepiece lens system includes a first positive lens group having a positive power and a second lens group having a negative power, located in this order from the object side. The second lens group has a negative lens element having a concave surface on a viewer's eye side and satisfies the following relationship:

$$-0.7 < fE/fEN < 0$$

$$0.5 < fE/rE < 3.5$$

wherein fE designates the focal length of the eyepiece lens system, fEN the focal length of the negative lens element of the eyepiece lens system, and rE the radius of curvature of a concave surface of the eyepiece lens system closest to a viewer's eye.

According to still another aspect of the present invention, in a real image type of view finder having an objective lens system, a condenser lens, an image erecting optical system, and an eyepiece lens system, located in this order as viewed from an object to be photographed, the eyepiece lens system includes a positive lens group and a negative lens group, located in this order from the object side. The condenser lens, image erecting optical system, and eyepiece lens system satisfy the following relationship:

$$0.15 < LE/fE < 0.5$$

$0.9 < fBE/fE < 1.3$ wherein LE designates the distance between the condenser lens and the image erecting optical system, and fBE the conversion value in terms of distance between the condenser lens and the eyepiece lens system.

The present disclosure relates to subject matter contained in Japanese Patent Application Nos. HEI 03-355423 and 03-355424 (both filed on Nov. 25, 1991), and Japanese patent Application Nos. HEI 04-227567 and HEI 04-227568 (both filed on Aug. 26, 1992), which are expressly incorporated herein by reference in their entireties.

BRIEF DESCRIPTION OF THE DRAWINGS

The invention will be described below in detail with reference to the accompanying drawings, in which:

FIG. 3 is a lens diagram of a real image type of variable power view finder at a low magnification, according to a first embodiment of the present invention;

FIGS. 4A–4D is a diagram of aberrations that occur in a view finder at a low magnification, according to a first embodiment of the present invention;

FIG. 9 is a lens diagram of a real image type of variable power view finder at a high magnification, according to a third embodiment of the present invention;

FIGS. 10A–10D is a diagram of aberrations that occur in a view finder at a high magnification, according to a third embodiment of the present invention;

FIG. 13 is a lens diagram of a real image type of variable power view finder at a high magnification, according to a fourth embodiment of the present invention;

FIGS. 14A–14D is a diagram of aberrations that occur in a view finder at a high magnification, according to a fourth embodiment of the present invention;

FIG. 21 is a lens diagram of a real image type of variable power view finder at a high magnification, according to a sixth embodiment of the present invention;

FIGS. 22A–22D is a diagram of aberrations that occur in a view finder at a high magnification, according to a sixth embodiment of the present invention;

FIGS. 27a, 27b and 27c are diagrams showing lateral aberrations that occur in a view finder at a high magnification, according to a sixth embodiment of the present invention; in which FIG. 27a represents aberration according to design values, FIG. 27b the case where an eccentric error exists in a first lens, and FIG. 27c the case where an eccentric error exists in second lens;

FIGS. 28a and 28b are diagrams showing lateral aberrations that occur in a view finder at a high magnification, according to a sixth embodiment of the present invention; in which FIG. 28a represents the case where there is an eccentric error of a first surface of a first lens, and FIG. 28b the case where there is an eccentric error of a second surface of a first lens;

FIG. 29 is a lens diagram of a real image type of variable power view finder at a high magnification, according to a seventh embodiment of the present invention;

FIGS. 30A–30D is a diagram of aberrations that occur in a view finder at a high magnification, according to a seventh embodiment of the present invention;

FIGS. 35a, 35b, and 35c are diagrams showing lateral aberrations that occur in a view finder at a high magnification, according to a seventh embodiment of the present invention; in which FIG. 35a represents aberration according to design values, FIG. 35b the case where an eccentric error exists in a first lens, and FIG. 35c the case where an eccentric error exists in a second lens;

FIGS. 36a and 36b are diagrams showing lateral aberrations that occur in a view finder at a high magnification, according to a seventh embodiment of the present invention; in which FIG. 36a represents the case where there is an eccentric error of a first surface of a first lens, and FIG. 36b the case where there is an eccentric error of a second surface of a first lens;

FIG. 41 is a lens diagram of a real image type of variable power view finder at a high magnification, according to a ninth embodiment of the present invention;

FIGS. 42A–42D is a diagram of aberrations that occur in a view finder at a high magnification, according to a ninth embodiment of the present invention;

FIG. 43 is a lens diagram of a real image type of variable power view finder at a low magnification, according to a ninth embodiment of the present invention;

FIGS. 44A–44D is a diagram of aberrations that occur in a view finder at a low magnification, according to a ninth embodiment of the present invention;

FIGS. 47a, 47b and 47c are diagrams showing lateral aberrations that occur in a view finder at a high magnification, according to a ninth embodiment of the present invention; in which FIG. 47a represents aberration according to design values, FIG. 47b the case where an eccentric error exists in a first lens, and FIG. 47c the case where an eccentric error exists in a second lens;

FIGS. 48a and 48b are diagrams showing lateral aberrations that occur in a view finder at a high magnification, according to a ninth embodiment of the present invention; in which FIG. 48a represents the case where there is an eccentric error of a first surface of a first lens, and FIG. 48b the case where there is an eccentric error of a second surface of a first lens;

FIGS. 51a, 51b, and 51c are diagrams showing lateral aberrations that occur in a view finder at a high magnification, according to a fifth embodiment of the present invention; in which FIG. 51a represents aberration according to design values, FIG. 51b the case where an eccentric error exists in a first lens, and FIG. 51c the case where an eccentric error exists in a second lens;

FIGS. 52a and 52b are diagrams showing lateral aberrations that occur in a view finder at a high magnification, according to a fifth embodiment of the present invention; in which FIG. 52a represents the case where there is an eccentric error of a first surface of a first lens, and FIG. 52b the case where there is an eccentric error of a second surface of a first lens;

FIGS. 53a and 53b are illustrative views showing the manner in which field frame 11, which is used for panoramic photography, is inserted in and retracted from the vicinity of the object image formed by the objective optical system; wherein, FIG. 53a shows the state for effecting normal (full-size) photography, and FIG. 53b shows the state for effecting panoramic photography; and, FIGS. 54a and 54b are diagrams showing a lens surface eccentric error and a lens eccentric error, respectively.

DESCRIPTION OF THE PREFERRED EMBODIMENT

Figure 1:
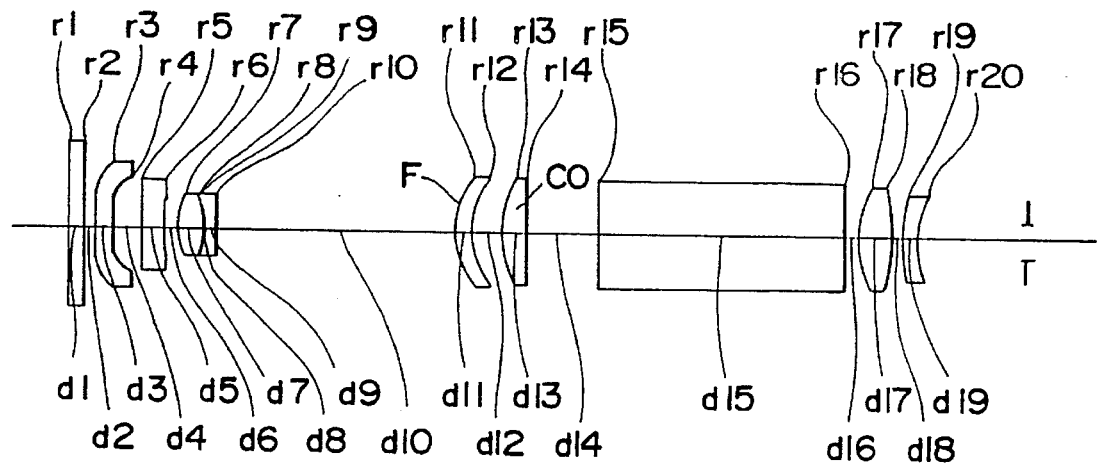
FIG. 1 is a lens diagram of a real image type of variable power view finder at a high magnification, according to a first embodiment of the present invention.
Figure 2A:
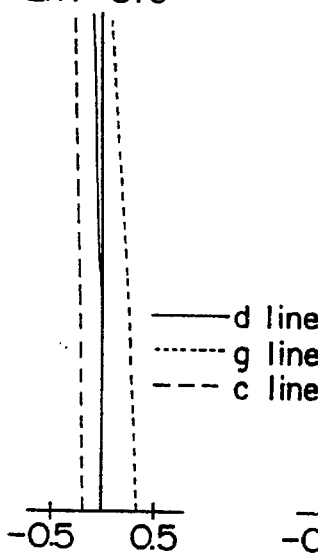
FIGS. 2A–2D is a diagram of aberrations that occur in a view finder at a high magnification, according to a first embodiment of the present invention.
Figure 2B:
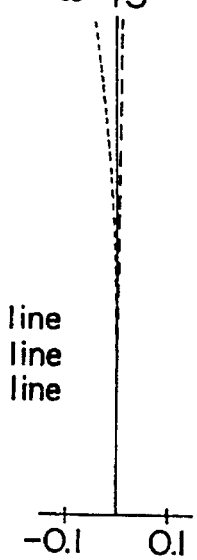
Figure 2C:
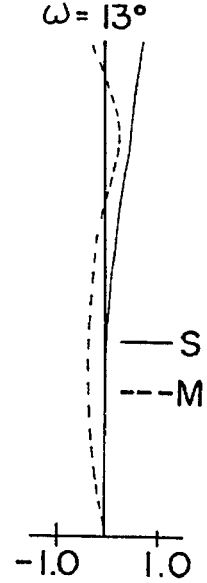
Figure 2D:
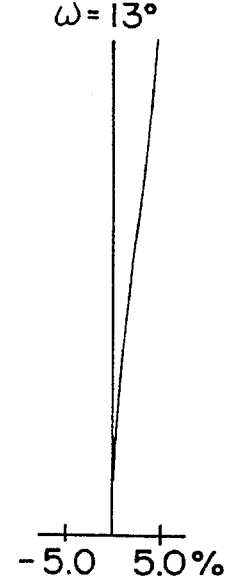

In a real image type of variable power view finder, a retrofocus type zoom system, in which the objective lens system includes two lens groups can be used to increase the angle of view of the objective lens system. A a negative lens group is located close to an object to be photographed and a positive lens group is located close to a photographer's eye. An objective lens system having three lens groups can also be used, wherein a first negative lens group, a second negative lens group, and a third lens group are located in this order from the object to be photographed.

When the half angle of view of the objective lens system on the short focal length side is larger than 30°, it is necessary that the negative lens group have at least two negative lenses close to the object. Also, it is desirable that the negative lens closest to the object is an aspheric lens having opposite aspheric lens surfaces, in order to reduce the lens diameter of the front lens group.

In the case that the objective lens system is made of two lens groups, the first negative lens group will have a large power. Accordingly, the focus adjustment of the objective lens system (i.e., the adjustment of the light converging point which is deviated due to the change in magnification of the objective lens) can be effected by a small displacement thereof. However, the lens which is adjusted to vary the focal length will inevitably be moved during this operation. As a result, a complex adjusting mechanism is required to compensate for this undesirable movement of the focal length adjusting lens.

In an objective lens system made of three lens groups, the first negative lens group is stationary. Accordingly, the adjusting mechanism can be simplified. However, in such a lens system, since the power of the lens, which is moved to adjust focus, is low, a large displacement of the lens is necessary for focus adjustment.

In the view finder, according to the first, second, third, and fifth through ninth embodiments, the objective lens system is comprised of two lens groups; a positive lens group and a negative lens group. In the view finder, according to the fourth embodiment, the objective lens system is comprised of three lens groups; a first negative lens group, a second negative lens group, and a positive lens group, in that order.

A real image type of variable power view finder, according to the present invention, has an objective lens system, an image erecting optical system, and an eyepiece lens system, located in this order as viewed from an object to be photographed. The objective lens system comprises a first lens group having a negative power and second lens group having a positive power located in this order from the object side. The distance between the first and second lens groups is varied to change the magnification. The first lens group of the objective system comprises at least two negative lens elements.

In the view finder, according to the first, second, third, and fifth through ninth embodiments, the first negative lens element of the negative lens group, which constitutes the objective lens system closest to an object to be photographed, has two aspheric surfaces and satisfies the following relationship.

Condition 1:

$$0.07 < \Delta X1/f0S < 0.5 \quad (1)$$

$$0.05 < \Delta X2/f0S < 0.4 \quad (2)$$

wherein $\Delta X1$ represents the maximum asphericity of a first lens surface of an aspheric negative lens (i.e., the maximum asphericity of an aspheric negative lens surface on the side of an object to be photographed from a paraxial spherical surface thereof); $\Delta X2$, the maximum asphericity of a second lens surface of an aspheric negative lens (i.e., the maximum asphericity of a lens surface of an aspheric negative lens surface on the side of a viewer's eye from a paraxial spherical surface thereof); and, f0S, the focal length of the objective lens system at low magnification.

The above mentioned inequalities (1) and (2) define the aspheric shapes of the first and second lens surfaces of the first negative lens element. To eliminate aberration, both the first and second lens surfaces are preferably distorted in the positive direction from the paraxial spherical surface. If the value of $\Delta X1/f0S$ or $\Delta X2/f0S$ is below the lower limit (i.e., 0.07 or 0.05), the asphericity will be too small for the astigmatism and distortion to be corrected. Conversely, if the value of $\Delta X1/f0S$ or $\Delta X2/f0S$ is above the upper limit (i.e., 0.5 or 0.4), it is very difficult to prepare an aspheric lens having a sufficiently large asphericity. Furthermore, possible eccentric error or mounting error has a negative effect on lens efficiency.

The first lens group having negative power which constitutes the objective lens system in a view finder, according to the third embodiment of the present invention, is comprised of three lenses, including first and second negative lens elements, and a third positive lens element, as viewed from the side of the object to be photographed, and satisfies the following relationship.

Condition 2:

$$v1P < 45 \quad (3)$$

wherein $v1P$ represents the Abbe number of the third positive lens element in the negative lens group of the objective lens system.

Generally speaking, the chromatic aberration becomes larger as the length of the objective lens system is decreased. However, chromatic aberration can be corrected by providing a positive lens which satisfies the above-mentioned inequality (3) on the viewer's eye side of the two negative meniscus lenses in the first lens group located close to the object to be photographed.

The second lens group, which has positive power constitutes the objective lens system in a view finder, according to all embodiments of the present invention, includes a first positive lens element and second negative lens element located in this order as viewed from the side of the object to be photographed, and satisfies the following relationship.

Condition 3:

$$v2P < v2N \quad (4)$$

wherein $v2P$ represents the Abbe number of the first positive lens element in the second lens group having positive power of the objective lens system; and, $v2N$ represents the Abbe number of the second negative lens element in the second lens group of the objective lens system.

Chromatic aberration does not occur when the above-mentioned inequality (4) is satisfied. Thus, it is possible to restrict or minimize the change in chromatic aberration due to the variation in power (magnification) without increasing the length of the objective lens system.

The objective lens system comprises a first lens group having negative power, a second lens group having negative power, and a third lens group having positive power, located in this order from the object side, so that the first lens group is stationary and the second lens group and third lens group are movable in the optical axis direction to vary the magnification.

The first negative lens element in the first lens group having negative power, which constitutes the objective lens system in a view finder, according to the fourth embodiment, has two aspheric lens surfaces and satisfies the following relationship.

Condition 4:

$$0 < \Delta X1/f0S < 0.4 \quad (5)$$

$$0 < \Delta X2/f0S < 0.3 \quad (6)$$

wherein $\Delta X1$ represents the maximum asphericity of a first lens surface of an aspheric negative lens; $\Delta X2$, the maxima asphericity of a second lens surface of an aspheric negative lens; and, f0S, the focal length of the objective lens system at low magnification.

As can be understood from the foregoing, in the case that the objective lens system includes three lens groups, the various aberrations can be eliminated or restricted by setting the values of $\Delta X1/f0S$ and $\Delta X2/f0S$ so as to satisfy the relationship defined by inequalities (5) and (6).

It is necessary to provide a predetermined space between the terminal lens group of the objective lens system, farthest from the object, and the condenser lens to locate at least a part of the image erecting optical system between the objective lens system and the condenser lens.

If a lens for correcting curvature of field is disposed in the predetermined space, the planeness of the object image will be improved. If the curvature correcting lens is a positive lens, it can be partly used as a condenser lens, so that the power of the condenser lens can be reduced, resulting in an easy correction of the aberration caused in the condenser lens. Furthermore, if the curvature correcting lens is an aspheric lens, the astigmatism can be effectively corrected to obtain a better planeness of the object image.

Although the image erecting optical system is a prism system in the above-mentioned embodiments, it is possible to use a plurality of mirrors in place of the prism to constitute the image erecting optical system.

It is possible to make the eyepiece lens system using positive and negative lens groups, located in this order as viewed from the object to be photographed, to increase the distance between the condenser lens and the eyepiece lens system without increasing the focal length of the eyepiece, and to thereby obtain a large angular magnification of the view finder.

The view finder, according to the illustrated embodiments, satisfies the following relationship.

Condition 5:

$$0.7 < fE/fEN < 0 \quad (7)$$

wherein fE designates the focal length of the eyepiece lens system, and fEN the focal length of the negative lens on the viewer's eye side in the eyepiece lens system, respectively.

The above-mentioned inequality (7) defines the power distribution of the positive and negative lens groups of the eyepiece lens system. If the value of fE/fEN is larger than the upper limit (=0), no arrangement in which the positive and negative lens groups are located in this order, as viewed from the object side, can be realized. Conversely, if the value of fE/fEN is smaller than the lower limit (=−0.7), a large angular magnification can be obtained, but the powers of the positive and negative lens groups will be too large to clearly observe a field frame. This also makes it difficult to correct the aberration of the eyepiece lens system and the view finder.

If the positive lens group and the negative lens group of the eyepiece lens system consists of a single positive lens and a negative meniscus lens with a concave surface located on the viewer's eye side, respectively, it is preferable that the radius of curvature rE of the negative meniscus lens satisfy the following relationship.

Condition 6:

$$0.5 < fE/rE < 3.5 \quad (8)$$

The use of the negative meniscus lens as the negative lens group of the eyepiece lens system, as mentioned above, makes it possible to obtain a large eyepiece lens system power to thereby increase the angular magnification of the view finder without decreasing the distance between the condenser lens and the eyepiece lens system.

The above-mentioned inequality (8) defines the shape of the negative lens of the eyepiece lens system on the viewer's eye side thereof. If the value of fE/rE is above the upper limit (=3.5), it is very difficult to correct the astigmatism. Conversely, if the value of fE/rE is below the lower limit (=0.5), the radius of curvature of the concave surface thereof will be too small to ensure a sufficient distance between the eyepiece lens and the pupil of a viewer's eye. The distance between the eyepiece lens and the pupil varies depending on environmental conditions. Accordingly, this space must be somewhat large.

The dioptric power can be adjusted by moving the positive lens group within the eyepiece lens system without varying the distance between the eyepiece lens and the pupil.

In a recently introduced compact camera in which a panoramic shot can be photographed in a picture plane having a quarter of the upper and lower edges cut away, and in which a wider angle of the taking lens is used, a field frame is retractably inserted in an optical path of the view finder in accordance with the photographic range of the panoramic shot, so that the field of view of the finder coincides with the photographic range. To this end, it is necessary to provide a large space between the condenser lens and the image erecting optical system, so that the field frame for the panoramic shots can be inserted in that space. Preferably, the distance LE between the condenser lens and the image erecting optical system satisfies one following relationship:

Condition 7:

$$0.15 < LE/fE < 0.5 \quad (9)$$

$$0.9 < fBE/fE < 1.3 \quad (10)$$

wherein LE designates the distance between the condenser lens and the image erecting optical system, and fBE the conversion value in terms of distance between the condenser lens and the eyepiece lens system.

The above-mentioned inequality (9) defines the distance between the condenser lens and the erecting optical system. If the value of LE/fE is below the lower limit (=0.15), sufficient space cannot be obtained. Conversely, if the value of LE/fE is above the upper limit (=0.5), the length of the eyepiece optical system becomes unacceptably long.

The above-mentioned inequality (10) defines the distance between the condenser lens and the eyepiece lens system. If the value of fBE/fE is below the lower limit (=0.9), the space for the erecting optical system will be too small to satisfy the inequality (9). Conversely, if the value of fBE/fE is above the upper limit (=1.3), the length of the eyepiece optical system will be unacceptably long, and it will be difficult to correct the aberrations that occur in the eyepiece optical system.

Looking at FIG. 1, which shows the first embodiment of the present invention, the aspheric lenses of the first negative lens, having the lens surfaces r3 and r4, and the second negative lens, having the lens surfaces r5 and r6, are provided behind the cover glass having the first and second lens surfaces r1 and r2, as viewed from the side of the object to be photographed.

In the first, second, fifth, sixth, seventh, and ninth embodiments, the first and second lenses of the first lens system of negative power of the objective lens group satisfies the following relationship:

Condition 8:

$$|SF1| < 1 \quad (11)$$

$$0 \leq ||SF1| - |SF2|| \leq 4 \quad (12)$$

The value SF (shape factor) is given by:

$$SF = (r1 + r2)/(r2 - r1)$$

wherein r1 and r2 are paraxial radii of curvature of opposite lens surfaces of the respective lenses.

In the case of an aspheric lens, the shape factor SF mainly determines the surface shape in the vicinity of the optical axis.

When condition 8, as described above, is satisfied, an optical system can be provided in which there would be little or no deterioration of the image forming efficiency if a manufacturing error or eccentric error occurred.

Figure 17:
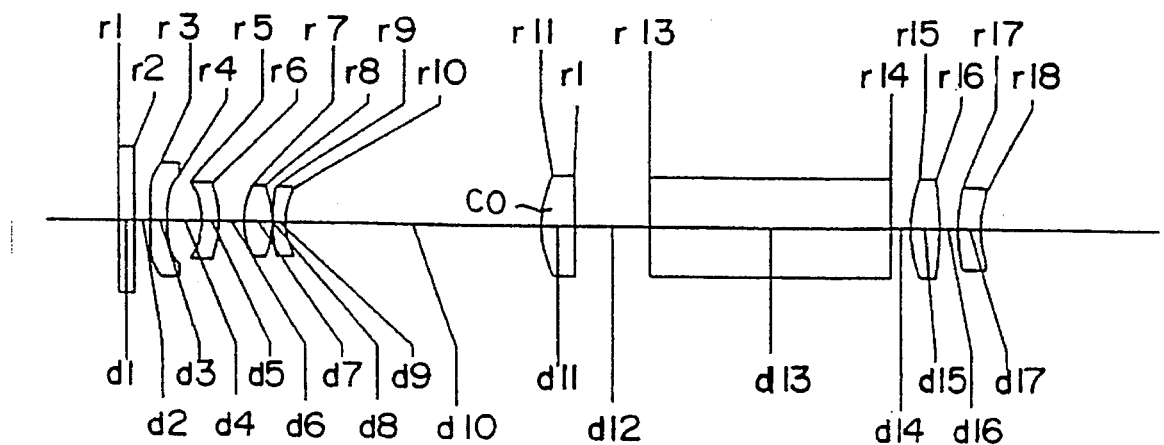
FIG. 17 is a lens diagram of a real image type of variable power view finder at a high magnification, according to a fifth embodiment of the present invention.
Figure 18A:
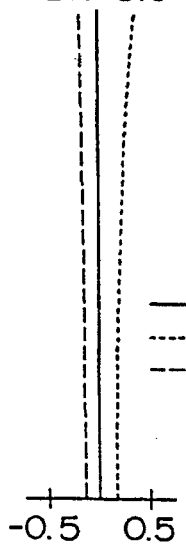
FIGS. 18A–18D is a diagram of aberrations that occur in a view finder at a high magnification, according to a fifth embodiment of the present invention.
Figure 18B:
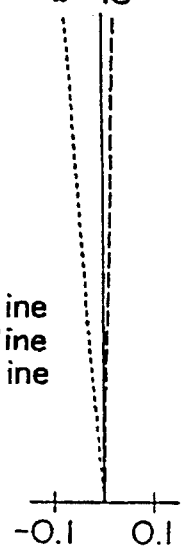
Figure 18C:
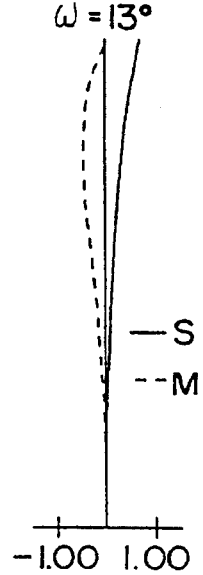
Figure 18D:
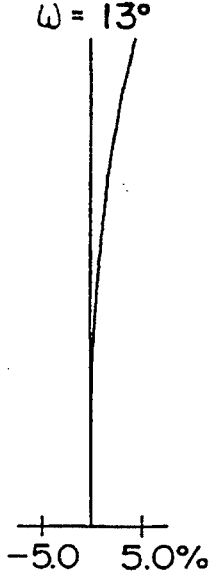

In particular, when the aspheric lens system is used in a view finder, as shown in FIG. 17, it is preferable that the lenses on the object side and image side satisfy the above-mentioned inequalities (11) and (12), respectively.

To realize a wide angle, both the first and second lenses are preferably negative lenses, as shown in FIG. 1.

In the embodiment illustrated in FIG. 17, all lens surfaces of the first and second lens elements in the first lens group having negative power of the objective lens system satisfy the following relationship, at least at high magnification.

$$|SP| \leq 0.2 \quad (13)$$

wherein SP designates the variation in power of the aspheric lens surface within an effective radius thereof.

The power variation SP is defined as follows. The shape of the aspheric lens surface is represented by the following equation (a).

$$x=(Cy^8/(1+(1-(1+K)C^8y^8)^{1/2}))+A4y^4+A6y^6+A8y^8 \quad (a)$$

$$dx/dy=(Cy/(1-(1+K)C^8y^8)^{1/2})+4A4y^8+6A6y^6+8A8y^7 \quad (b)$$

$$d2x/dyz=(Cy/(1+K)C^8y^8)^{8/8})+12A4y^8+30A\ 6y^4+56A8y^6 \quad (c)$$

wherein x designates the distance, parallel with respect to the optical axis, from a point on the surface of the aspheric surface at a vertical distance y from the optical axis, to a vertical plane tangential to the apex of the aspheric surface; C, the curvature (1/r) at the apex of the aspheric surface; K, the coefficient of the cone and, A4, A6, and A8, the 4-order, 6-order, and 8-order aspheric surface coefficients, respectively. Primary and secondary differential equations of the equation (a) are given by equations (b) and (c), respectively.

The curvature (1/rm) of the meridional section of the aspheric surface at height y from the optical axis is given by;

$$1/rm=(d^2x/dy^8)/(1+(dx/dy)^2)^{8/2} \quad (d)$$

The surface power ψ of the aspheric surface at height y from the optical axis is given by:

$$\psi=(n-n')/rm \quad (e)$$

The power variation SP is represented by equation (f) below.

$$SP=\psi max-\psi min \quad (f)$$

wherein ψmax designates the maximum surface power within the effective radius range, from the optical axis of the aspheric surface, to the outer peripheral edge of the flux of ray, and ψmin designates the minimum surface power within the effective radius range, respectively.

If the relationship (13), mentioned above, is satisfied, a lens system can be provided in which little or no deterioration of optical efficiency resulting from eccentric error takes place, not only in the vicinity of the optical axis, but also in the circumferential portion. Deterioration of optical efficiency due to eccentric error is serious, particularly at a high magnification in the variable power optical system. Therefore, in the present invention, the relationship (13), mentioned above, must be satisfied, at least at high magnification.

Preferably, the lens surfaces of the first and second lenses satisfy the following relationships mentioned below, at least at a high magnification.

$$|SP1|\leq 0.1 \quad (14)$$

$$|SP2|\leq 0.2 \quad (15)$$

$$|SP3|\leq 0.04 \quad (16)$$

$$|SP4|\leq 0.06 \quad (17)$$

wherein SP1, SP2, SP3, and SP4 designate power variation of the front surface and the rear surface of the two negative lens elements of the objective lens system, respectively from the object side.

In the figures, Co and F represent the condenser lens and the field flattener lens, respectively.

FIG. 1 shows a real image type of variable power view finder, according to the present invention, which includes of an objective lens system having a first lens surface r1 through a twelfth lens surfaces r12, a condenser lens having a thirteenth lens surface r13 and a fourteenth lens surface r14, to transmit an object image formed by the objective lens system to an eyepiece lens system. The objective lens system further includes an image erecting prism system having fifteenth and sixteenth lens surfaces r15 and r16, which are developed in FIG. 1 to invert the object image, and an eyepiece lens system having positive and negative lenses with seventeenth through twentieth lens surfaces r17, r18, r19, and r20 to transmit the inverted object image to a viewer's eye. The objective lens system, the condenser lens, the prism system, and the eyepiece lens system are located in this order from the object side as shown, for example, in FIG. 1. The objective lens system includes at least two negative lenses.

FIGS. 2A–2D show chromatic aberration, chromatic aberration of magnification, astigmatism (S: sagittal, M: Meridional), and distortion at lines "d", "g", and "C" in the lens diagram, according to the first embodiment of the present invention, and as shown in FIG. 1.

FIGS. 3 and 4A–4D correspond to FIGS. 1 and 2 at a low magnification.

A numerical example of the first embodiment is shown in Tables 1, 2 and 3 below.

In FIGS. 1 through 4A–4D and Tables 1 through 3, EP (mm) designates the distance from the extremity of the terminal lens to the eye point (eye relief distance), r (mm) the radius of curvature of the associated lens surface, d (mm) the thickness of the lens or distance between the lenses, and n the refractive index of the lens at the "d" line, ν the Abbe's number of the lens at the "d" line, and E.R the eye ring, respectively.

Note that the first and second surfaces are defined by the cover glass and, accordingly, are not counted as lens groups of the objective lens.

In all embodiments except embodiments 3–5 and 9, and the 3rd, 4th, 5th, 6th, 7th, 10th, 11th, 13th, and 18th lens surfaces are aspheric surfaces. In all embodiments, the 3rd and 4th lens surfaces are aspheric. The aspheric surface is represented by the following equation X.

$$X=(Cy^2/(1+(1-(1+K)C^2y^2)^{1/2}))-A4y^4+A6y^6+A8y^8 \quad (g)$$

wherein X designates the distance, parallel with respect to the optical axis, from a point on the surface of the aspheric surface at a vertical distance y from the optical axis, to a vertical plane tangential to the apex of the aspheric surface; C, the curvature (1/r) of the apex of the aspheric surface; K, the coefficient of cone; and, A4, A6, and A8, the 4th, 6th, and 8th aspheric surface coefficients, respectively.

Examples of the cone coefficient K, and the 4th, 6th, and 8th aspheric surface coefficients A4, A6, and A8 are shown in Table 2. Radii of curvature of the aspheric surfaces in Table 1 are those at the apexes thereof. The magnification M, the half angle of view ω, and the distances d2, d6, and d10, vary in accordance with the change in magnification, as can be seen in Table 3. In Table 1, r1 and r12 are field flatter lens surfaces, and r13 and r14 are condenser lens surfaces.

Figure 5:
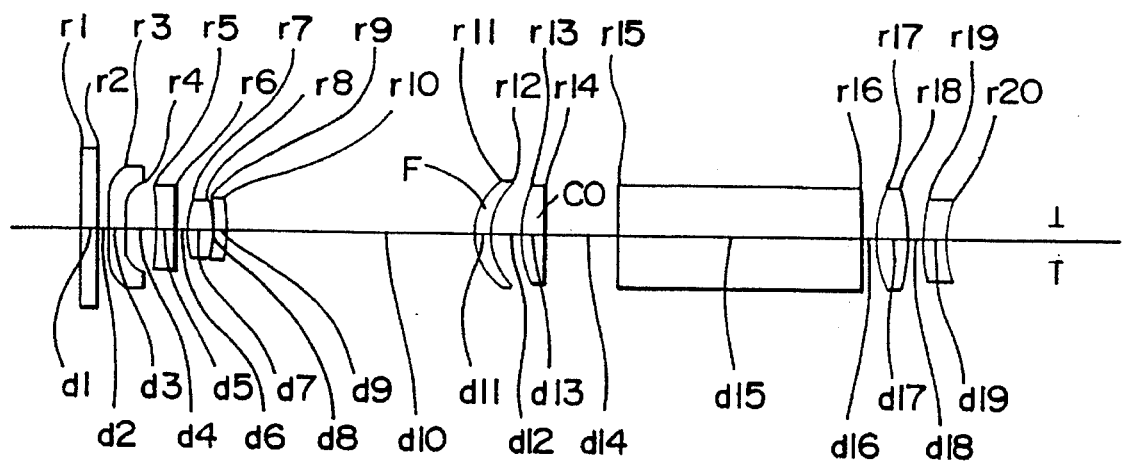
FIG. 5 is a lens diagram of a real image type of variable power view finder at a high magnification, according to a second embodiment of the present invention.
Figure 6A:
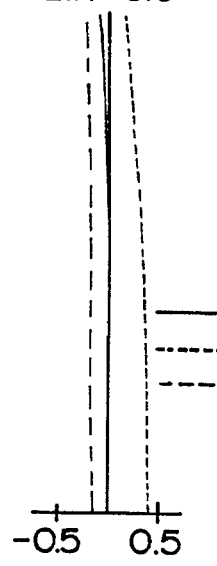
FIGS. 6A–6D is a diagram of aberrations that occur in a view finder at a high magnification, according to a second embodiment of the present invention.
Figure 6B:
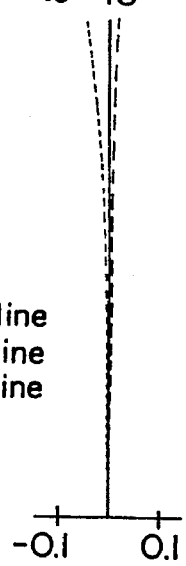
Figure 6C:
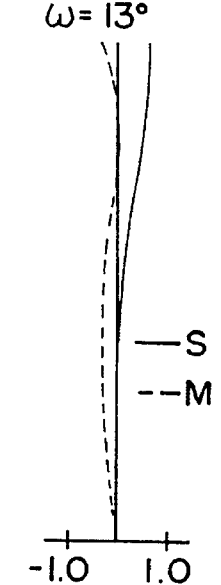
Figure 6D:
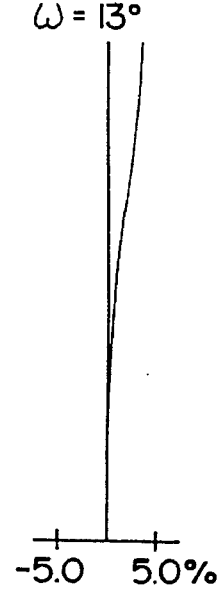
Figure 7:
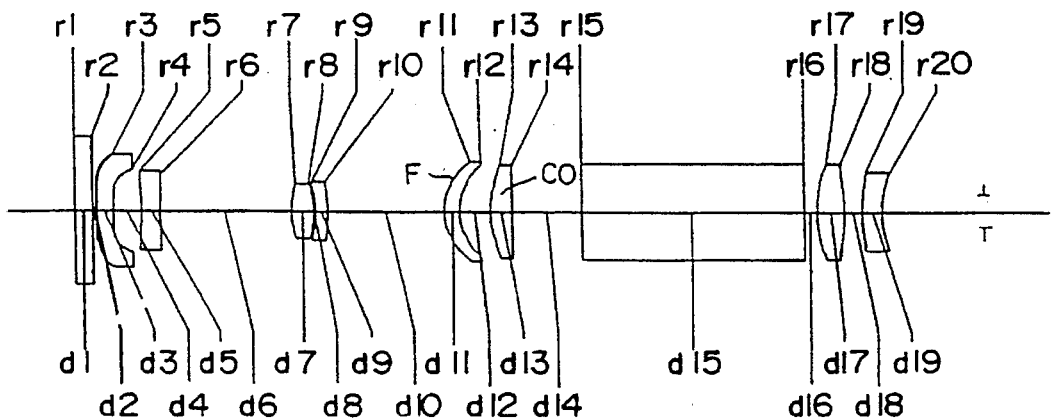
FIG. 7 is a lens diagram of a real image type of variable power view finder at a low magnification, according to a second embodiment of the present invention.
Figure 8A:
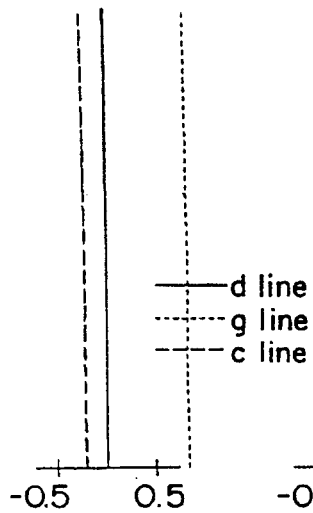
FIGS. 8A–8D is a diagram of aberrations that occur in a view finder at a low magnification, according to a second embodiment of the present invention.
Figure 8B:
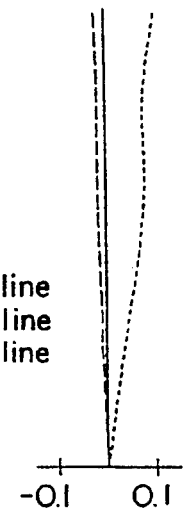
Figure 8C:
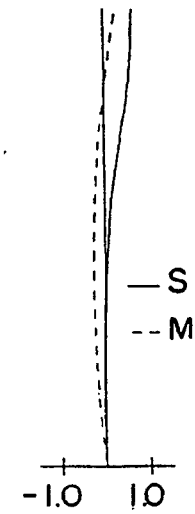
Figure 8D:
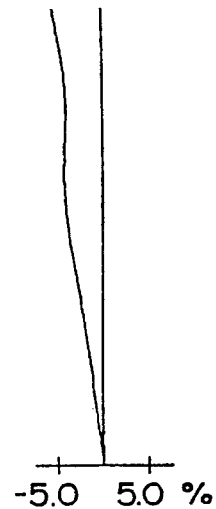

FIG. 5 shows a lens diagram of a view finder, according to the second embodiment of the present invention, at a high magnification. FIGS. 6A–6D show various aberrations that occur in the lens arrangement shown in FIG. 5. FIGS. 7 and 8A–8D correspond to FIGS. 5 and 6A–6D at a low magnification, respectively.

Numerical examples of the second embodiment are shown in Tables 4, 5, and 6, below. In the second embodiment of the present invention, the 3rd, 4th, 5th, 6th, 7th, 10th, 11th, 13th, and 18th lens surfaces are aspheric surfaces. The cone coefficients and the aspheric surface coefficients of the respective aspheric lens surfaces are shown in Table 5. The magnification M, the half angle of view ω, and the distances d2, d6, and d10 vary in accordance with the change in magnification, as can be seen in Table 6.

Figure 11:
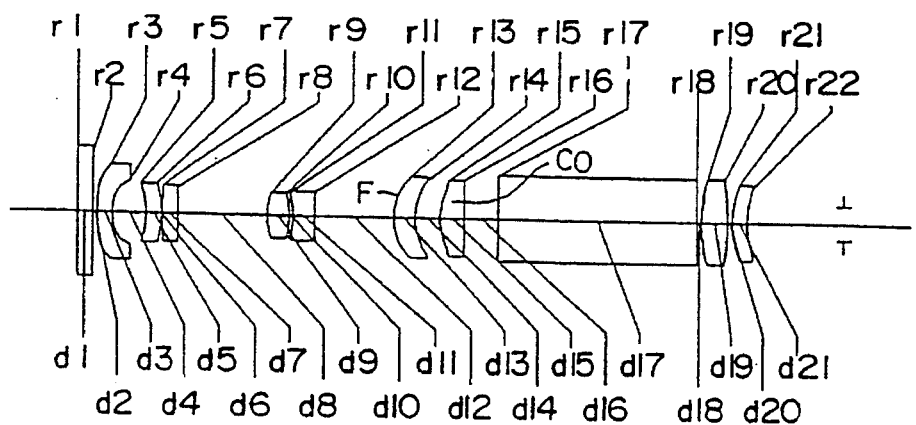
FIG. 11 is a lens diagram of a real image type of variable power view finder at a low magnification, according to a third embodiment of the present invention.
Figure 12A:
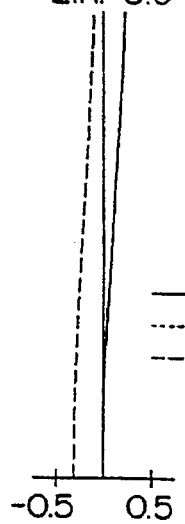
FIGS. 12A–12D is a diagram of aberrations that occur in a view finder of a low magnification, according to a third embodiment of the present invention.
Figure 12B:
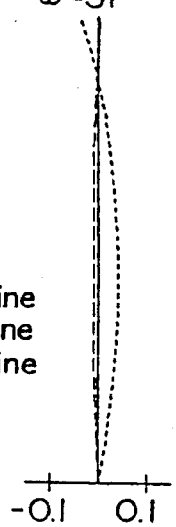
Figure 12C:
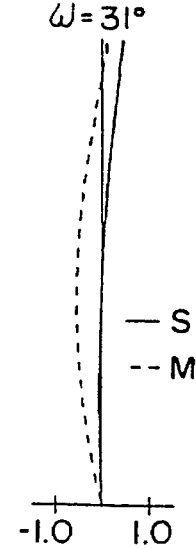
Figure 12D:
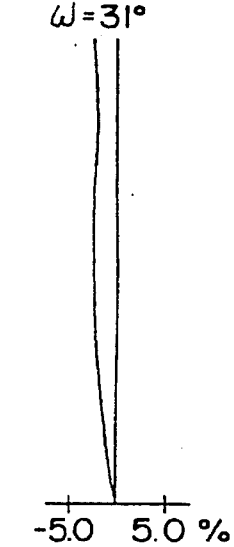
Figure 15:
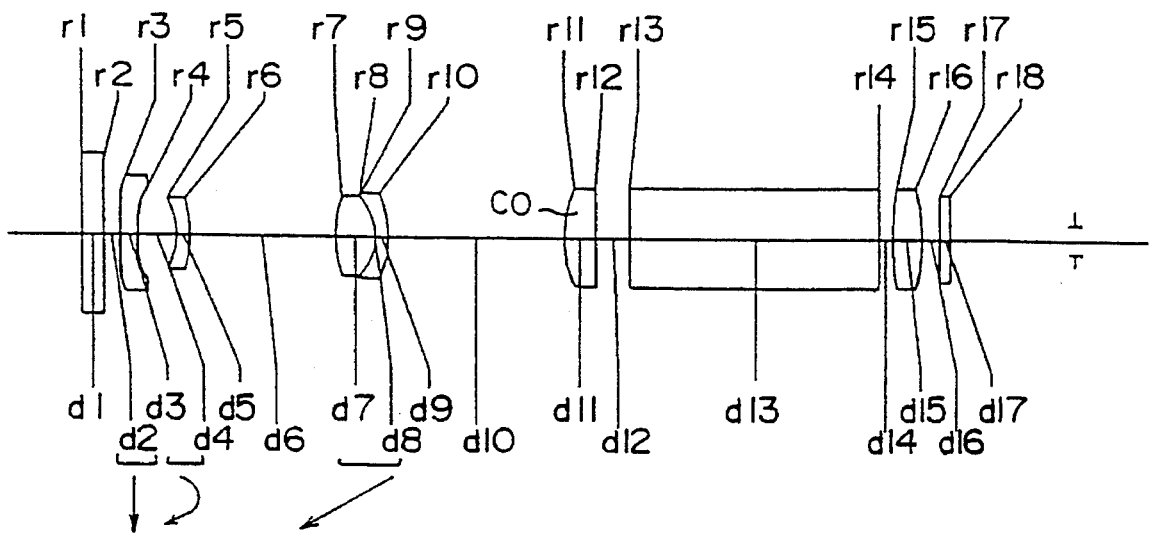
FIG. 15 is a lens diagram of a real image type of variable power view finder at a low magnification, according to a fourth embodiment of the present invention.
Figure 16A:
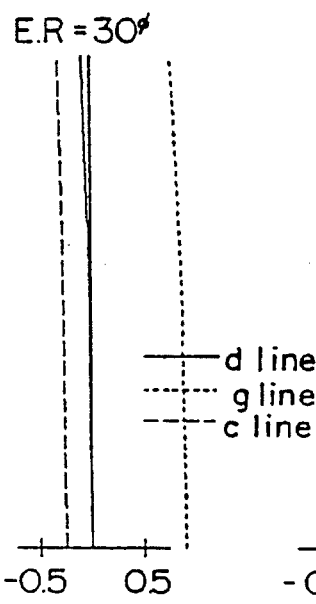
FIGS. 16A–16D is a diagram of aberrations that occur in a view finder at a low magnification, according to a fourth embodiment of the present invention.
Figure 16B:
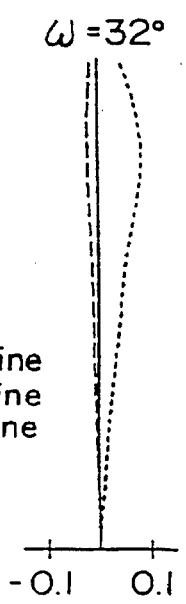
Figure 16C:
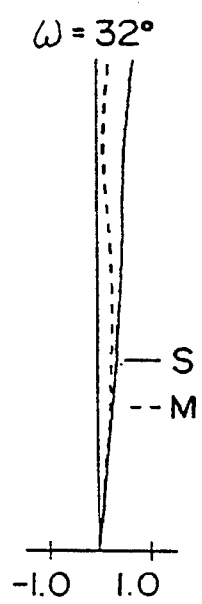
Figure 16D:
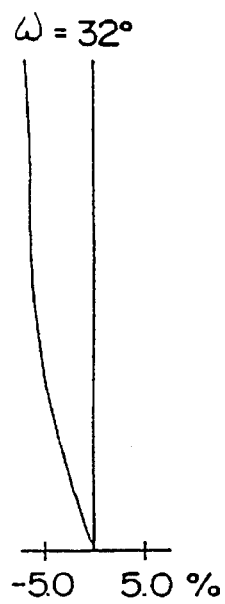

FIG. 9 shows a lens diagram of a view finder, according to the third embodiment of the present invention, at a high magnification. FIGS. 10A–10D show various aberrations that occur in the lens arrangement shown in FIG. 9. FIGS. 11 and 12 correspond to FIGS. 9 and 10A–10D at a low magnification, respectively.

Numerical examples of the third embodiment are shown in Tables 7, 8, and 9, below. In the third embodiment of the present invention, the 3rd, 4th, 8th, 9th, 12th, 13th, 15th, and 20th lens surfaces are aspheric surfaces. The cone coefficients and the aspheric surface coefficients of the respective aspheric lens surfaces are shown in Table 8. The magnification M, the half angle of view ω, and the distances d2, d8, and d12 vary in accordance with the change in magnification, as can be seen in Table 9. In Table 7, r13 and r14 are field flattener lens surfaces, and r15 and r16 are condenser lens surfaces.

FIG. 13 shows a lens diagram of a view finder, according to a fourth embodiment of the present invention, at a high magnification. FIGS. 14A–14D show various aberrations that occur in the lens arrangement shown in FIG. 13. FIGS. 15 and 16A–16D correspond to FIGS. 13 and 14A–14D at a low magnification, respectively.

Numerical examples of the fourth embodiment are shown in Tables 10, 11, and 12, below. In the fourth embodiment of the present invention, the 3rd, 4th, 5th, 7th, 11th, and 15th lens surfaces are aspheric surfaces, and r11 and r12 are condenser lens surfaces. The cone coefficients and the aspheric surface coefficients of the respective aspheric lens surfaces are shown in Table 11. The magnification M, the half angle of view ω, and the distances d4, d6, and d10 vary in accordance with the change in magnification, as can be seen in Table 12.

FIG. 17 shows a lens diagram of a view finder, according to the fifth embodiment of the present invention, at a high magnification. FIGS. 18A–18D show various aberrations that occur in the lens arrangement shown in FIG. 17. FIGS. 19 and 20A–20D correspond to FIGS. 17 and 18A–18D at a low magnification, respectively.

Numerical examples of the fifth embodiment are shown in Tables 13, 14, and 15, below. In the fifth embodiment of the present invention, the 3rd, 4th, 5th, 6th, 7th, 10th, 11th, and 16th lens surfaces are aspheric surfaces, and r11 and r12 are condenser lens CO surfaces. The cone coefficients and the aspheric surface coefficients of the respective aspheric lens surfaces are shown in Table 14. The magnification M, the half angle of view ω, and the distances d2, d6, and d10 vary in accordance with the change in magnification, as can be seen in Table 15.

FIG. 21 shows a lens diagram of a view finder, according to the sixth embodiment of the present invention, at a high magnification. FIGS. 22A–22D show various aberrations that occur in the lens arrangement shown in FIG. 21. FIGS. 23 and 24A–24D correspond to FIGS. 21 and 22 at a low magnification, respectively. In FIG. 21, r11 and r12 are field flattener lens F surfaces, and r13 and r14 are condenser lens CO surfaces.

Numerical examples of the sixth embodiment are shown in Tables 16, 17, and 18, below. In the sixth embodiment of the present invention, the 3rd, 4th, 5th, 6th, 7th, 10th, 11th, 13th, and 18th lens surfaces are aspheric surfaces. The cone coefficients and the aspheric surface coefficients of the respective aspheric lens surfaces are shown in Table 17. The magnification M, the half angle of view ω, and the distances d2, d6, and d10 vary in accordance with the change in magnification, as can be seen in Table 18.

Figure 25:
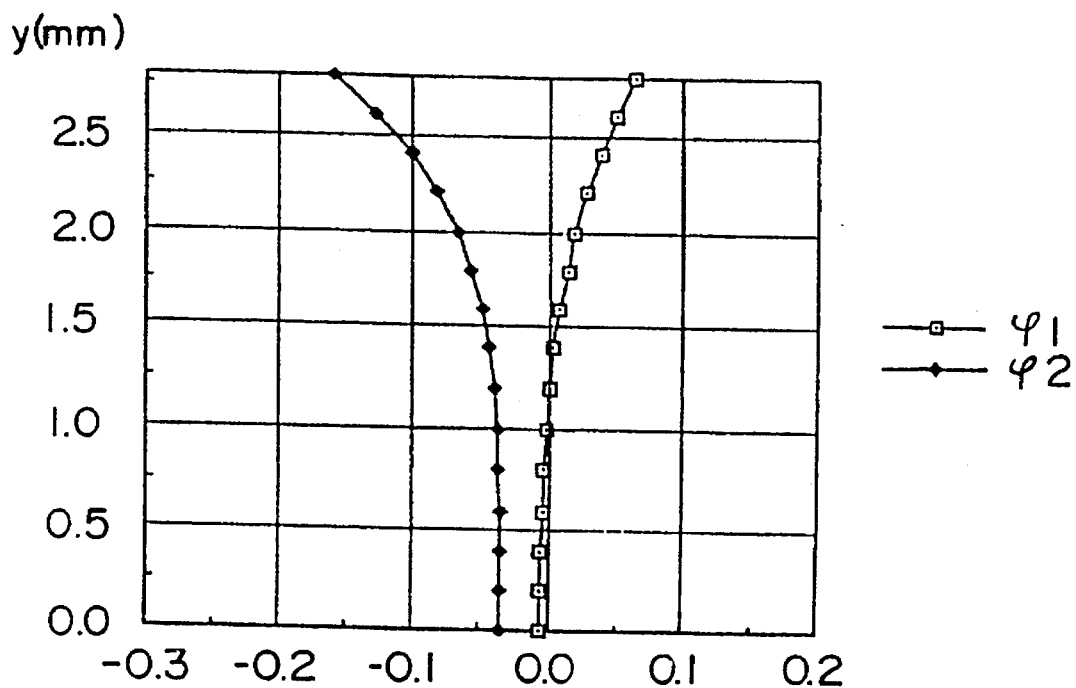
FIG. 25 is a diagram showing a variation of power depending on an image height of a first lens, according to a sixth embodiment of the present invention.
Figure 26:
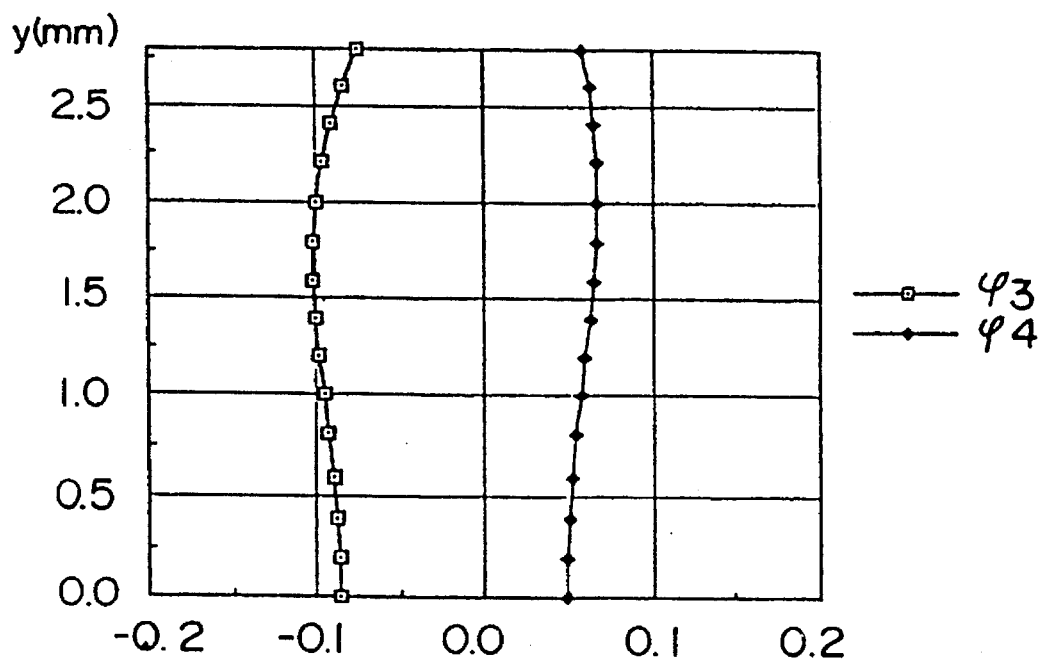
FIG. 26 is a diagram showing a variation of power depending on an image height of a second lens, according to a sixth embodiment of the present invention.

The power change in the aspheric surfaces of the first and second lenses, in accordance with the image height, is shown in FIGS. 25 and 26.

Figure 27:
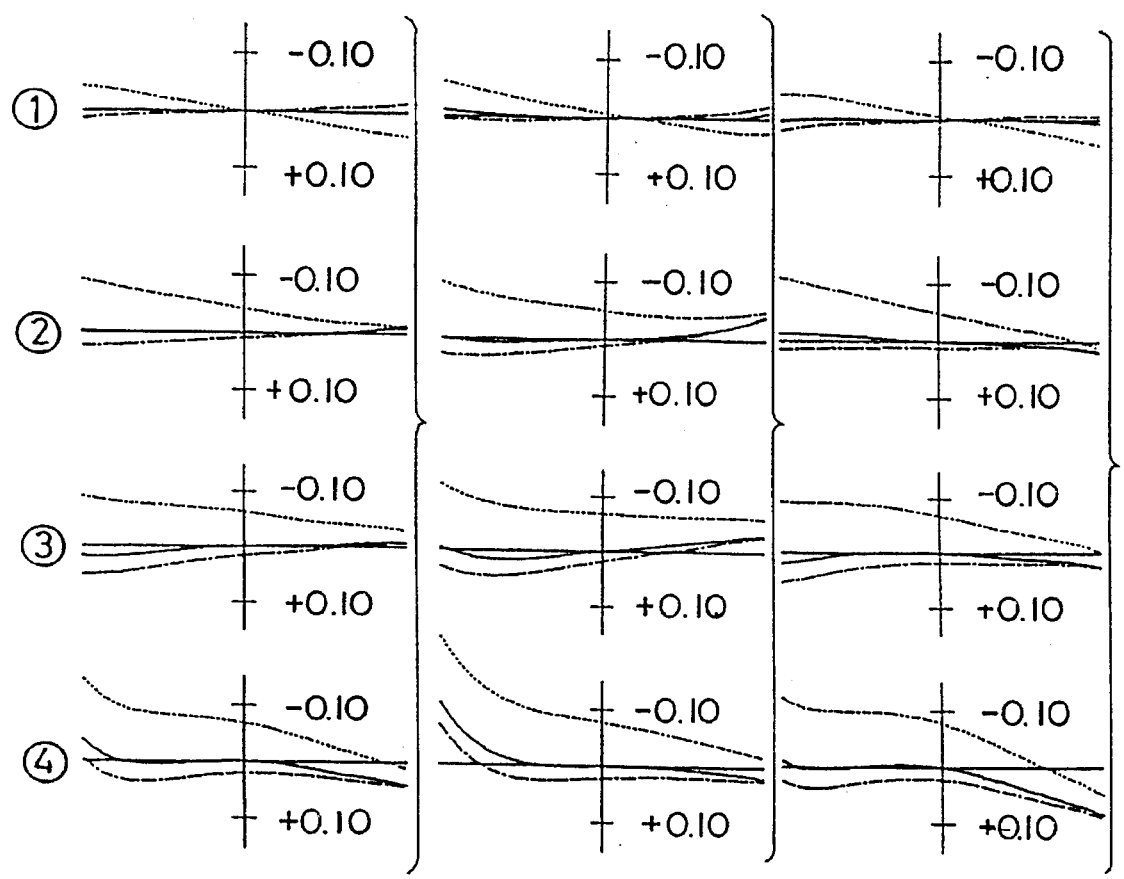
Figure 28:
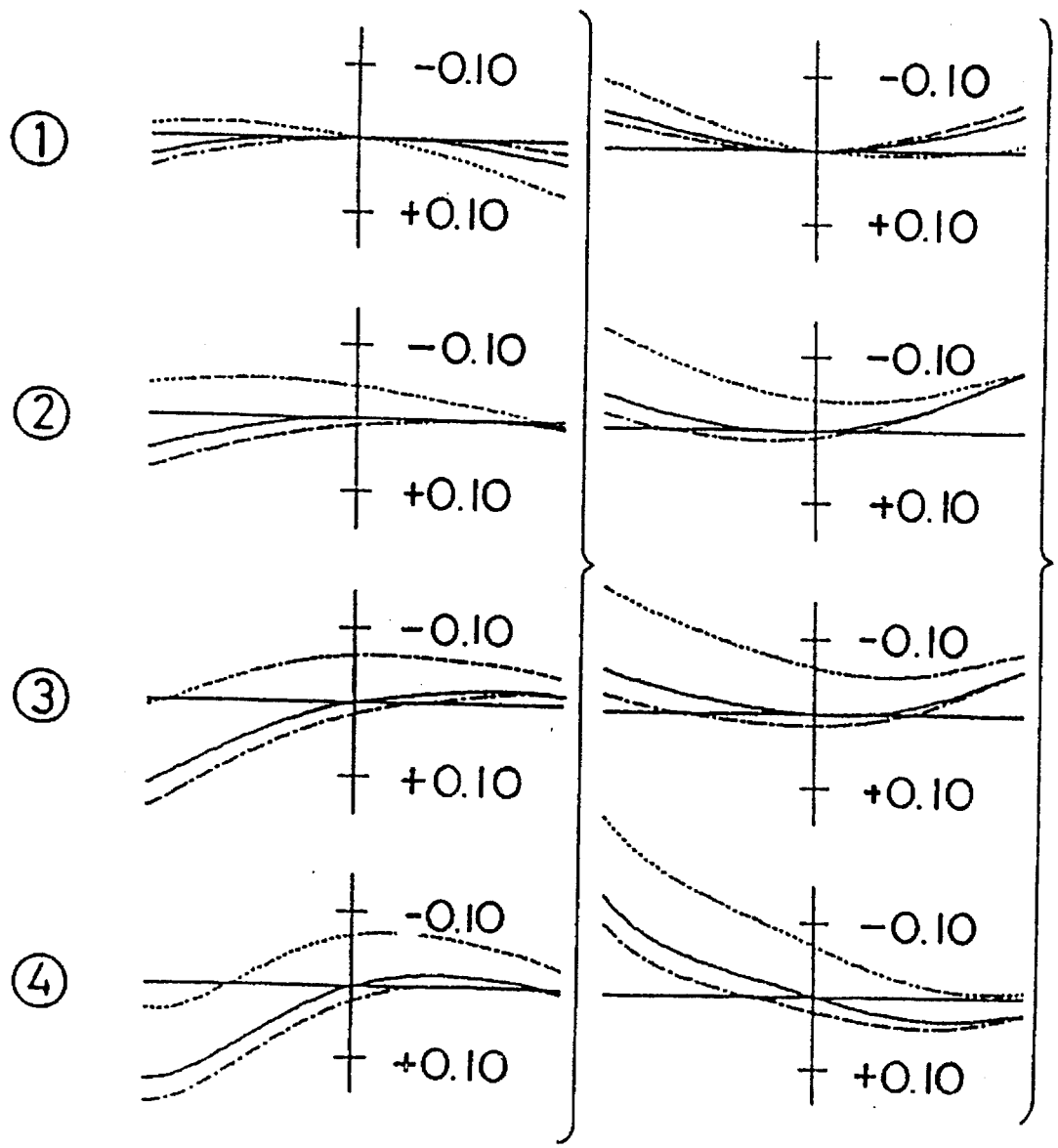
Figure 31:
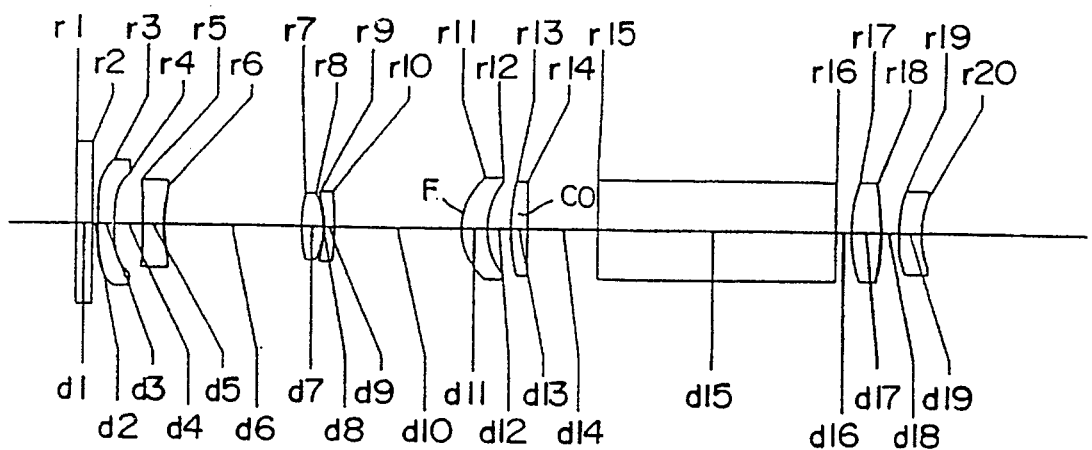
FIG. 31 is a lens diagram of a real image type of variable power view finder at a low magnification, according to a seventh embodiment of the present invention.
Figure 32A:
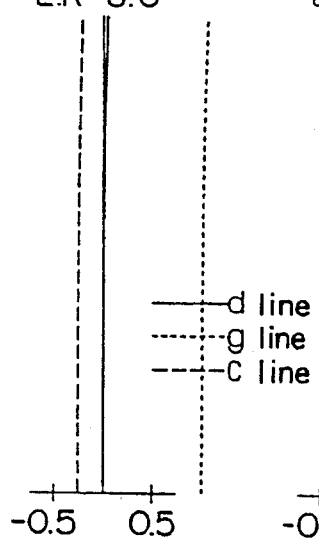
FIGS. 32A–32D is a diagram of aberrations that occur in a view finder at a low magnification, according to a seventh embodiment of the present invention.
Figure 32B:
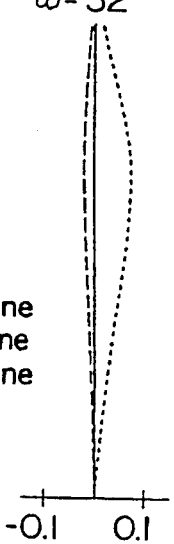
Figure 32C:
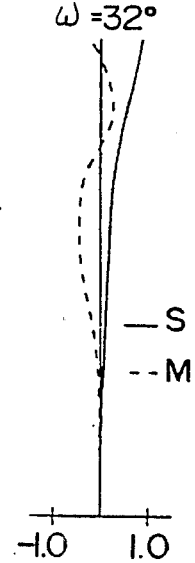
Figure 32D:
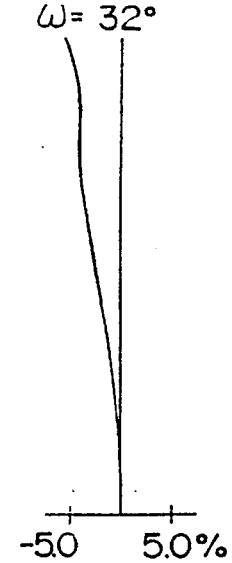

FIGS. 27 (27a, 27b, and 27c) and 28 (28a and 28b) show lateral aberrations at a high magnification, according to the sixth embodiment of the present invention. FIG. 27a shows aberration according to design values of the lens, FIG. 27b the case where the first lens is eccentric by 0.1 mm, and FIG. 27c the case where the second lens is eccentric by 0.1 mm. FIGS. 28a shows the case where there is a surface eccentricity of the first lens surface of the first lens of 0.05 mm, and FIG. 28b the case where there is a surface eccentricity of the second lens surface of the first lens of 0.05 mm, respectively.

FIGS. 27a–27c, 28a and 28b lateral aberrations at a high magnification, according to the sixth embodiment of the present invention. The lateral aberration shows the bundles of rays from points spaced from the optical axis by 0 mm, 400 mm, 580 mm and 680 mm on a surface of an object located at a distance of 2.97 m in front of the first lens surface.

The respective lateral aberrations represent those at angles of view (from above) of 0°, 7.7°, 11.0°, and 12.9°. The curves designated by a dashed and dotted line, solid line, and dotted line represent the lines "c", "d", and "g", respectively. This will be applied to diagrams of the lateral aberrations, which will be discussed hereinafter.

FIG. 29 shows a lens diagram of a view finder, according to the seventh embodiment of the present invention, at a high magnification. FIGS. 30A–30D show various aberrations that occur in the lens arrangement shown in FIG. 29. FIGS. 31 and 32A–32D correspond to FIGS. 29 and 30 at a low magnification, respectively.

Numerical examples of the seventh embodiment are shown in Tables 19, 20, and 21, below. In the seventh embodiment of the present invention, the 3rd, 4th, 5th, 6th, 7th, 10th, 11th, 13th, and 18th lens surfaces are aspheric surfaces. The cone coefficients and the aspheric surface coefficients of the respective aspheric lens surfaces are shown in Table 17. The magnification M, the half angle of view ω, and the distances d6 and d10 vary in accordance with the change in magnification, as can be seen in Table 21.

Figure 33:
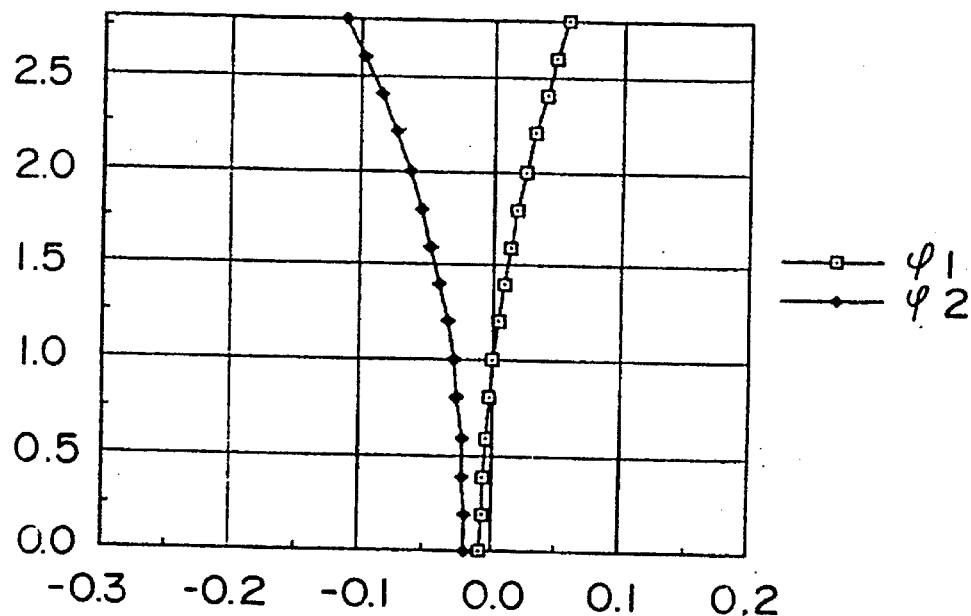
FIG. 33 is a diagram showing a variation of power depending on an image height of a first lens, according to a seventh embodiment of the present invention.
Figure 34:
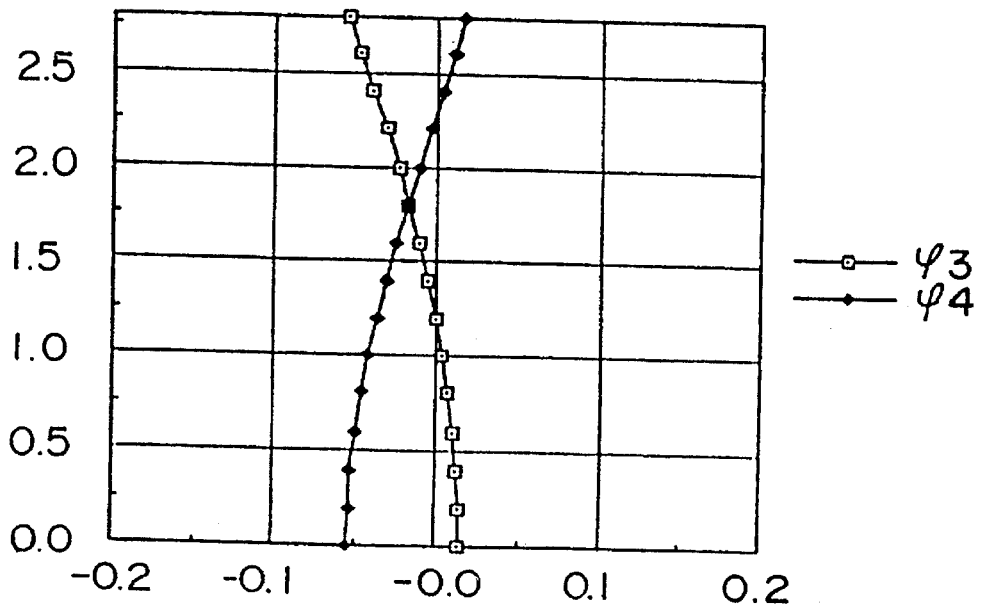
FIG. 34 is a diagram showing a variation of the power depending on an image height of a second lens, according to a seventh embodiment of the present invention.

The power change in the aspheric surfaces of the first and second lenses, in accordance with the image height, is shown in FIGS. 33 and 34.

Figure 35:
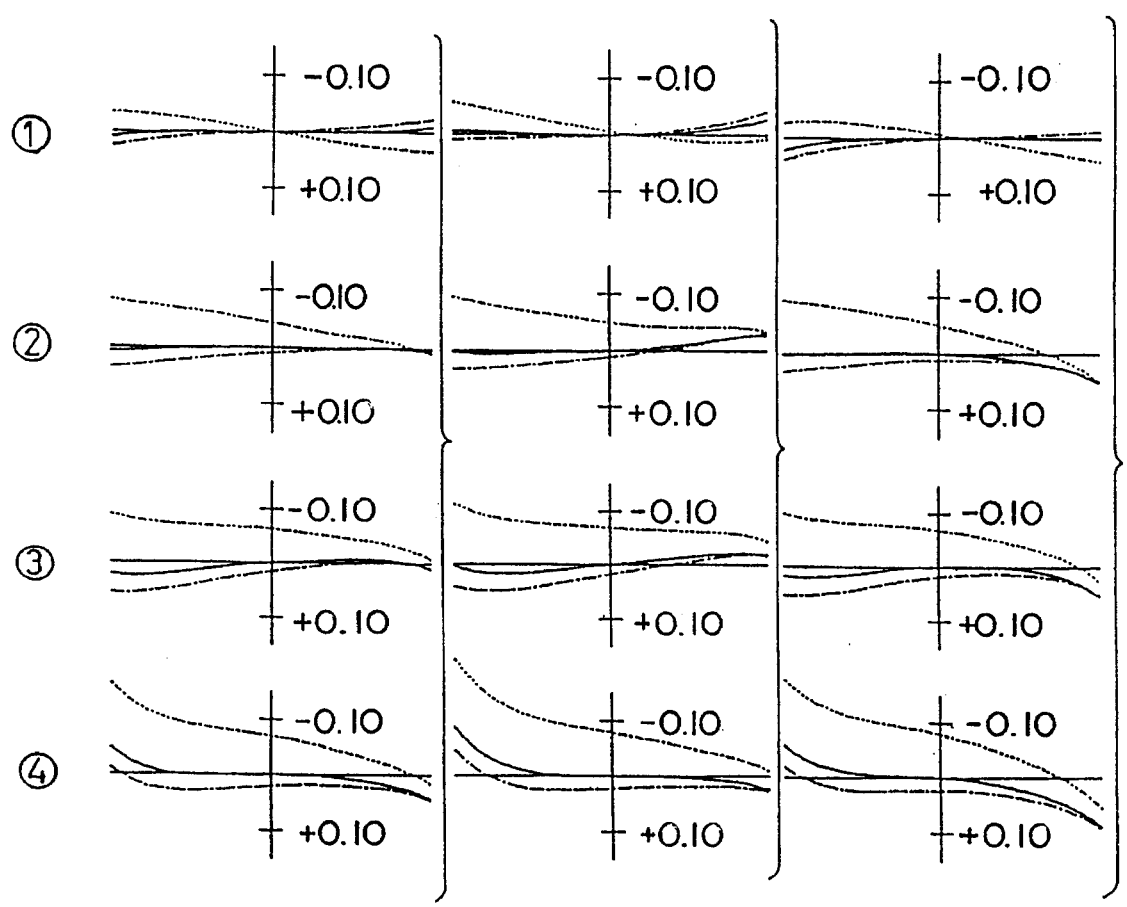
Figure 36:
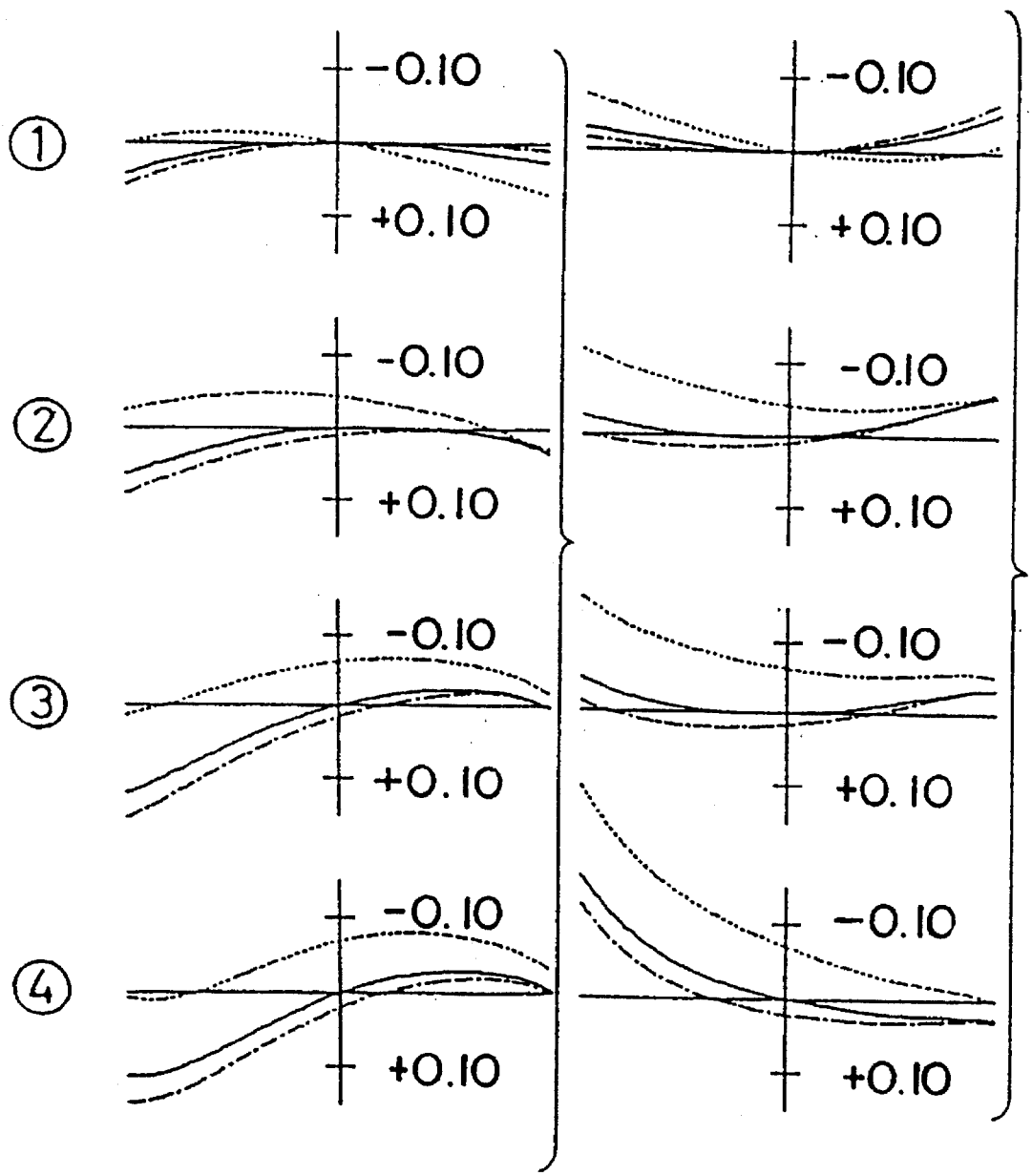

FIGS. 35 (35a, 35b, and 35c) and 36 (36a and 36b) show lateral aberrations at a high magnification, according to the seventh embodiment of the present invention. FIG. 35a shows aberration according to design values of the lens, FIG. 35b, the case where the first lens is eccentric by 0.1 mm, and FIG. 35c, the case where the second lens is eccentric by 0.1 mm. FIG. 36a shows the case where there is a surface eccentricity of the first lens surface of the first lens of 0.05 mm, and FIG. 36b the case where there is a surface eccentricity of the second lens surface of the first lens of 0.05 mm.

Figure 37:
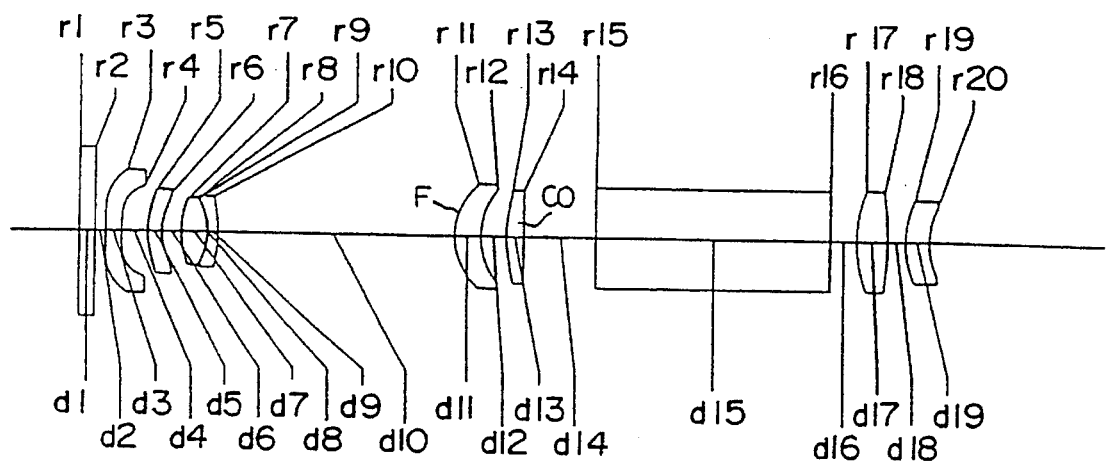
FIG. 37 is a lens diagram of a real image type of variable power view finder at a high magnification, according to an eighth embodiment of the present invention.
Figures 38A, 38B, 38C, 38D:
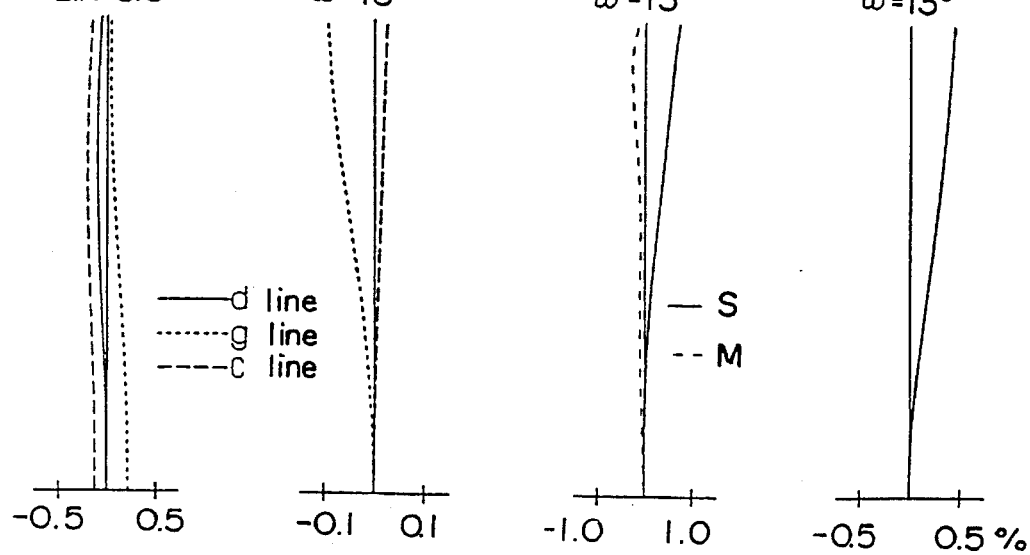
FIGS. 38A–38D is a diagram of aberrations that occur in a view finder at a high magnification, according to an eighth embodiment of the present invention.
Figure 39:
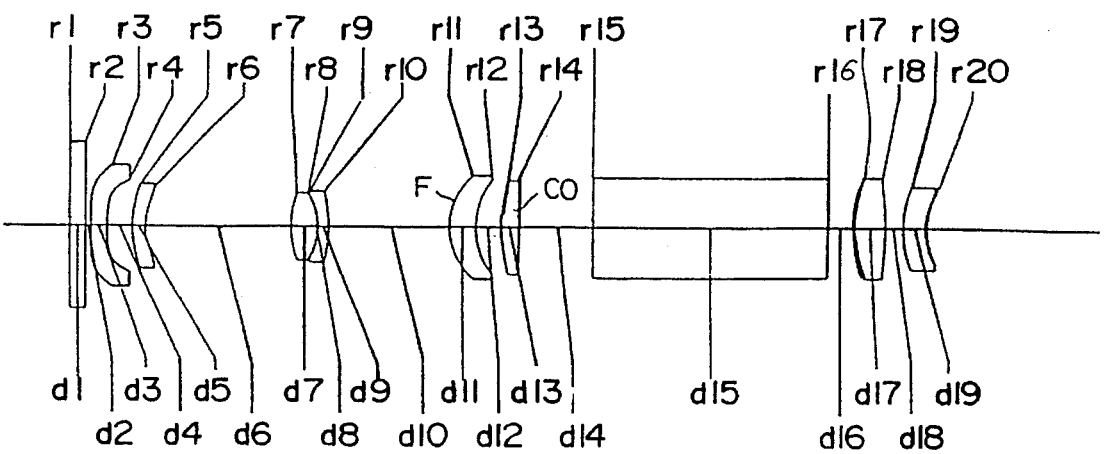
FIG. 39 is a lens diagram of a real image type of variable power view finder at a low magnification, according to an eighth embodiment of the present invention.
Figures 40A, 40B, 40C, 40D:
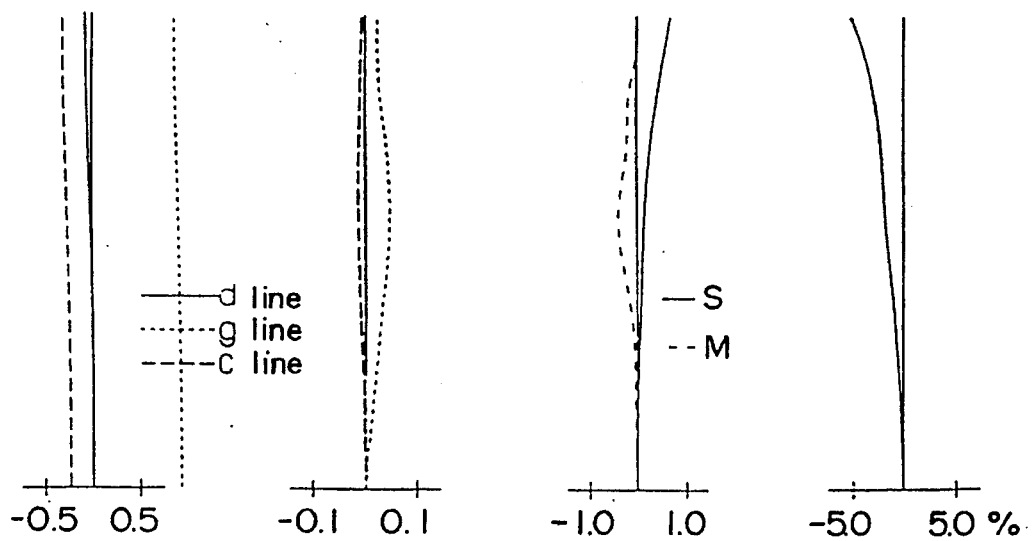
FIGS. 40A–40D is a diagram of aberrations that occur in a view finder a low magnification, according to an eighth embodiment of the present invention.

FIG. 37 shows a lens diagram of a view finder, according to the eighth embodiment of the present invention, at a high magnification. FIGS. 38A–38D show various aberrations that occur in the lens arrangement shown in FIG. 37. FIGS. 39 and 40A–40D correspond to FIGS. 37 and 38A–38D at a low magnification, respectively.

Numerical examples of the eighth embodiment are shown in Tables 22, 23, and 24, below. In the eighth embodiment of the present invention, the 3rd, 4th, 5th, 6th, 7th, 10th, 11th, 13th, and 18th lens surfaces are aspheric surfaces. The cone coefficients and the aspheric surface coefficients of the respective aspheric lens surfaces are shown in Table 23. The magnification M, the half angle of view ω, and the distances d2, d6, and d10 vary in accordance with the change in magnification, as can be seen in Table 24.

FIG. 41 shows a lens diagram of a view finder, according to the ninth embodiment of the present invention, at a high magnification. FIGS. 42A–42D show various aberrations that occur in the lens arrangement shown in FIG. 41. FIGS. 43 and 44A–44D correspond to FIGS. 41 and 42A–42D at a low magnification, respectively.

Numerical examples of the ninth embodiment are shown in Tables 25, 26, and 27, below. In the ninth embodiment of the present invention, the 3rd, 4th, 6th, 7th, 10th, 11th, and 16th lens surfaces are aspheric surfaces. The cone coefficients and the aspheric surface coefficients of the respective aspheric lens surfaces are shown in Table 26. The magnification M, the half angle of view ω, and the distances d2, d6, and d10 vary in accordance with the change in magnification, as can be seen in Table 27.

Figure 45:
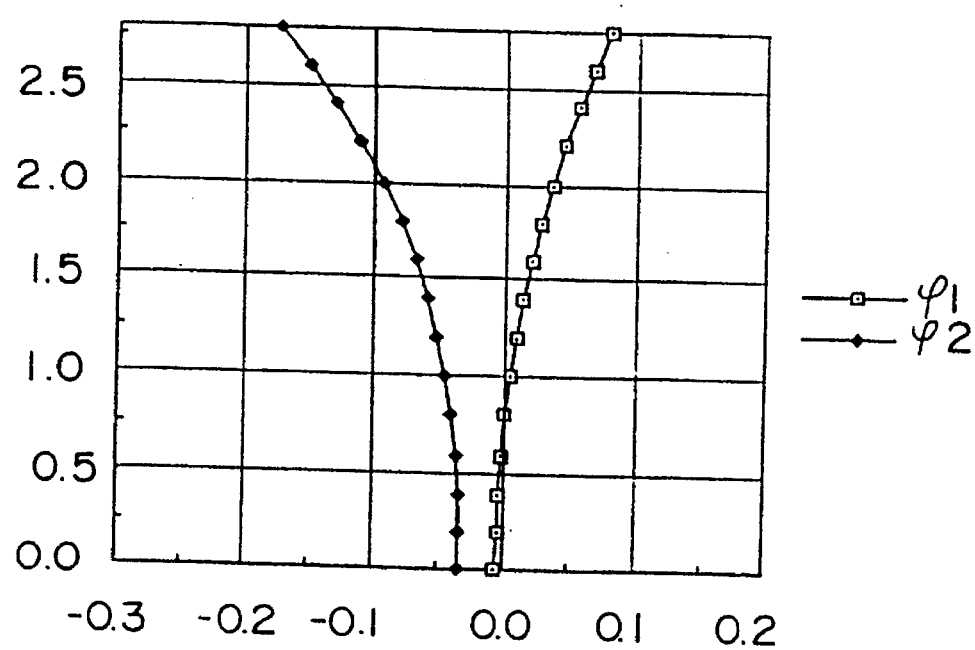
FIG. 45 is a diagram showing a variation of power depending on an image height of a first lens, according to a ninth embodiment of the present invention.
Figure 46:
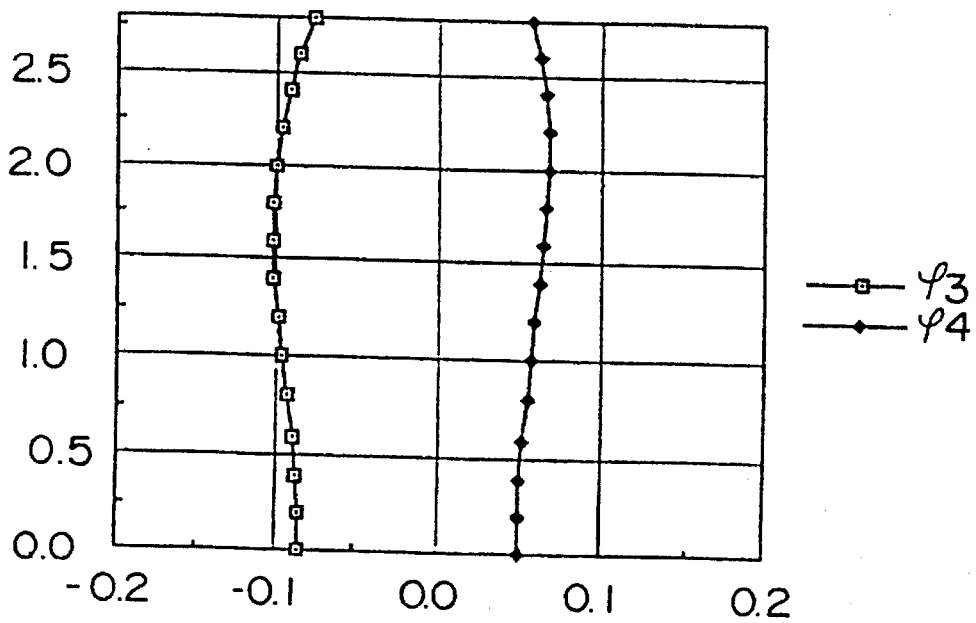
FIG. 46 is a diagram showing a variation of power depending on an image height of a second lens, according to a ninth embodiment of the present invention.

The power change in the aspheric surfaces of the first and second lenses, in accordance with the image height, is shown in FIGS. 45 and 46.

Figure 48A:
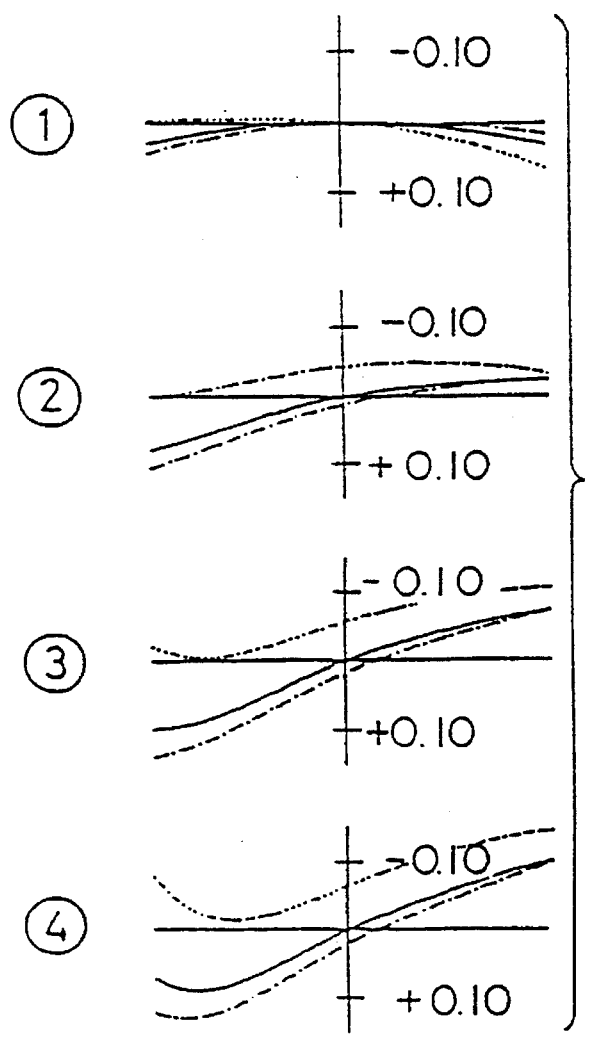
Figure 48B:
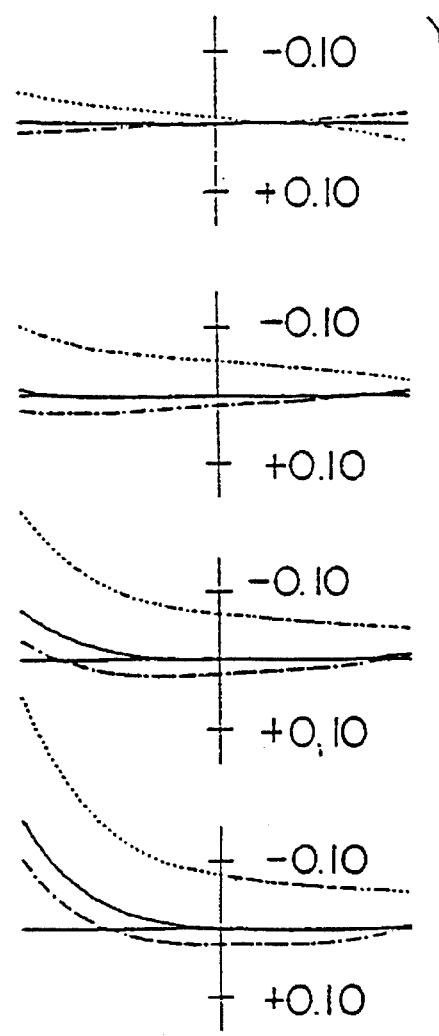

FIGS. 47 (47a, 47b, and 47c) and 48 (48a and 48b) show lateral aberrations at a high magnification, according to the ninth embodiment of the present invention. FIG. 47a shows aberration according to design values of the lens, FIG. 47b the case where the first lens is eccentric by 0.1 mm, and FIG. 47c the case where the second lens is eccentric by 0.1 mm. FIG. 48a shows the case where there is a surface eccentricity of the first lens surface of the first lens of 0.05 mm, and FIG. 48b the case where there is a surface eccentricity of the second lens surface of the first lens of 0.05 mm.

Figure 19:
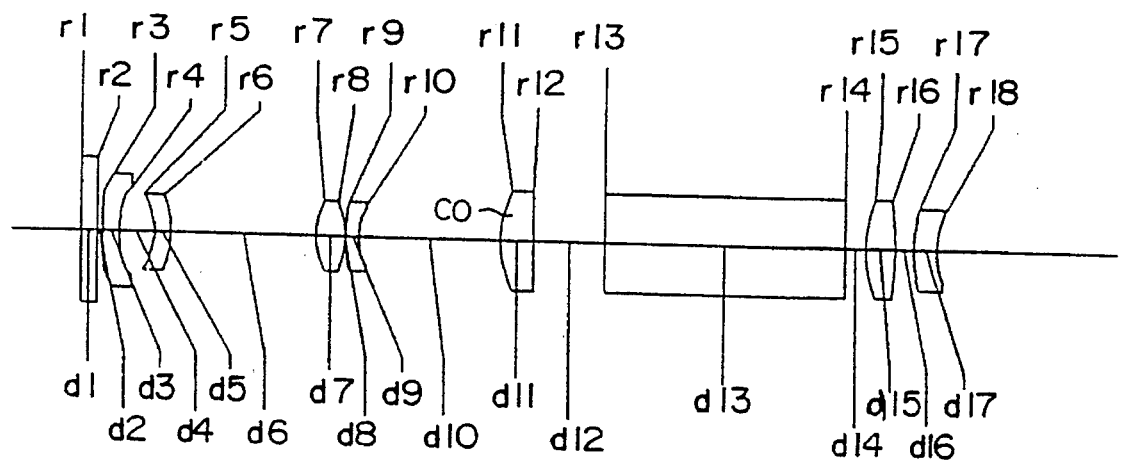
FIG. 19 is a lens diagram of a real image type of variable power view finder at a low magnification, according to a fifth embodiment of the present invention.
Figures 20A, 20B, 20C, 20D:
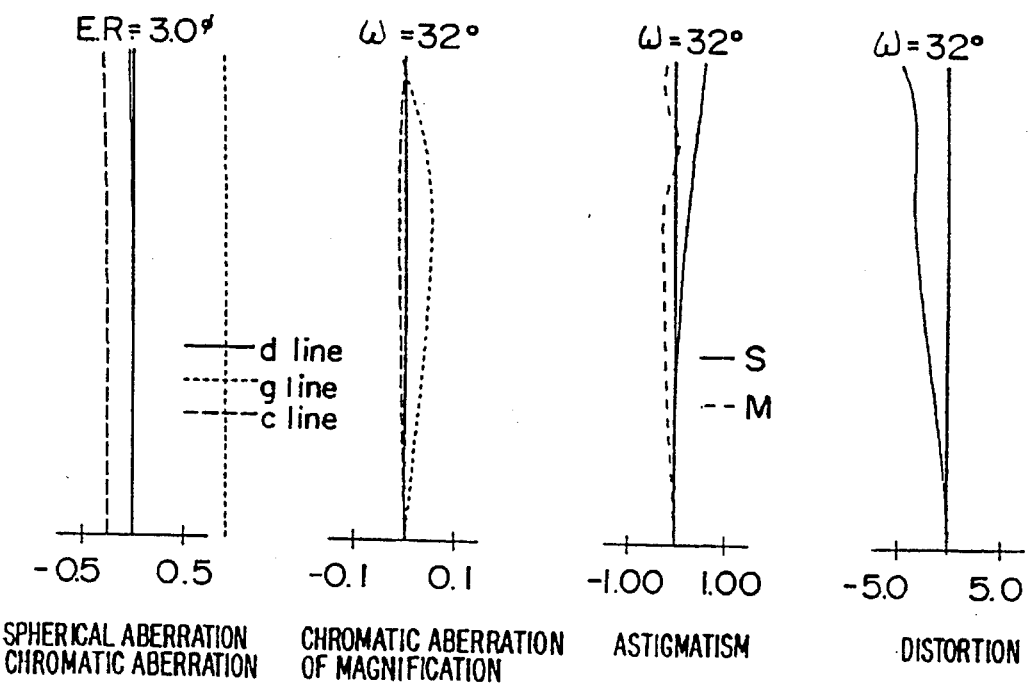
FIGS. 20A–20D is a diagram of aberrations that occur in a view finder at a low magnification, according to a fifth embodiment of the present invention.
Figure 23:
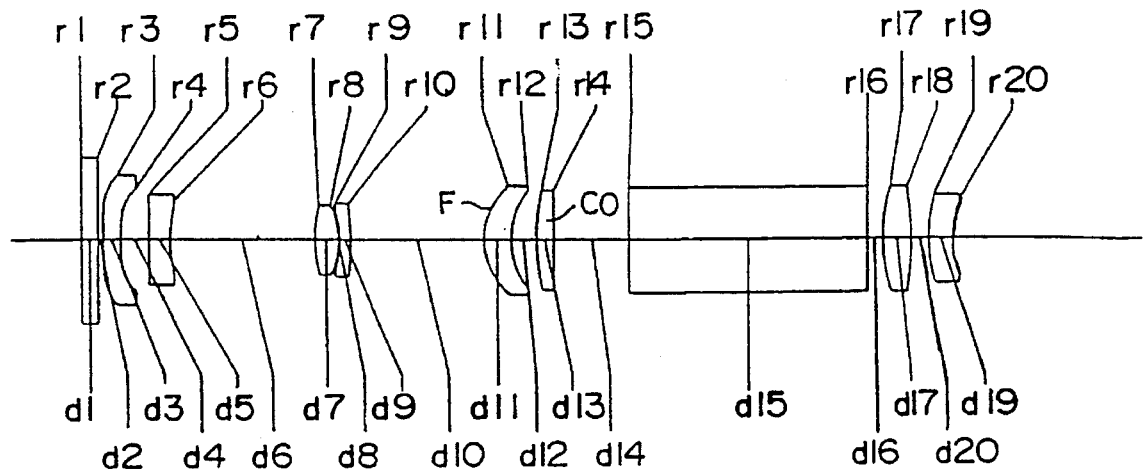
FIG. 23 is a lens diagram of a real image type of variable power view finder at a low magnification, according to a sixth embodiment of the present invention.
Figure 24A:
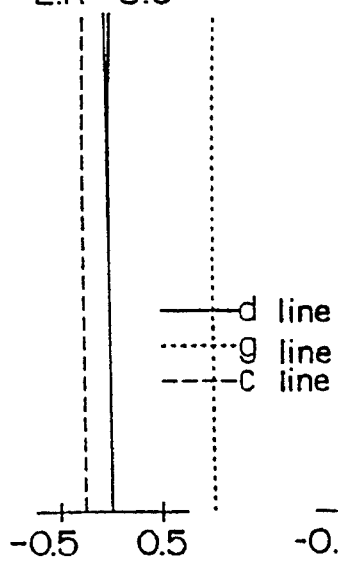
FIGS. 24A–24D is a diagram of aberrations that occur in a view finder at a low magnification, according to a sixth embodiment of the present invention.
Figure 24B:
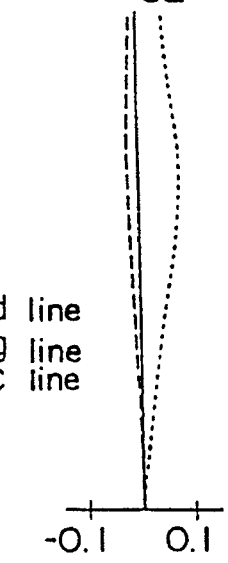
Figure 24C:
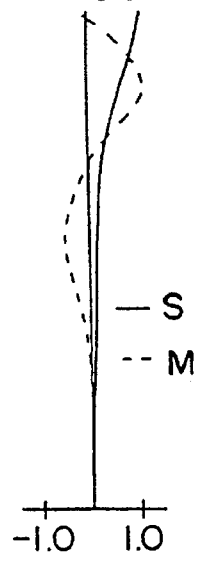
Figure 24D:
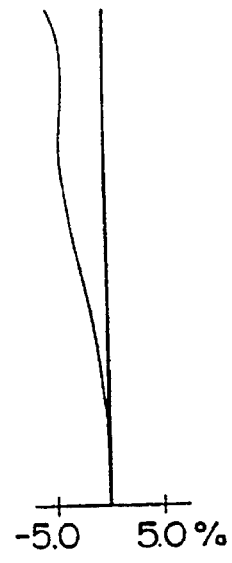
Figure 49:
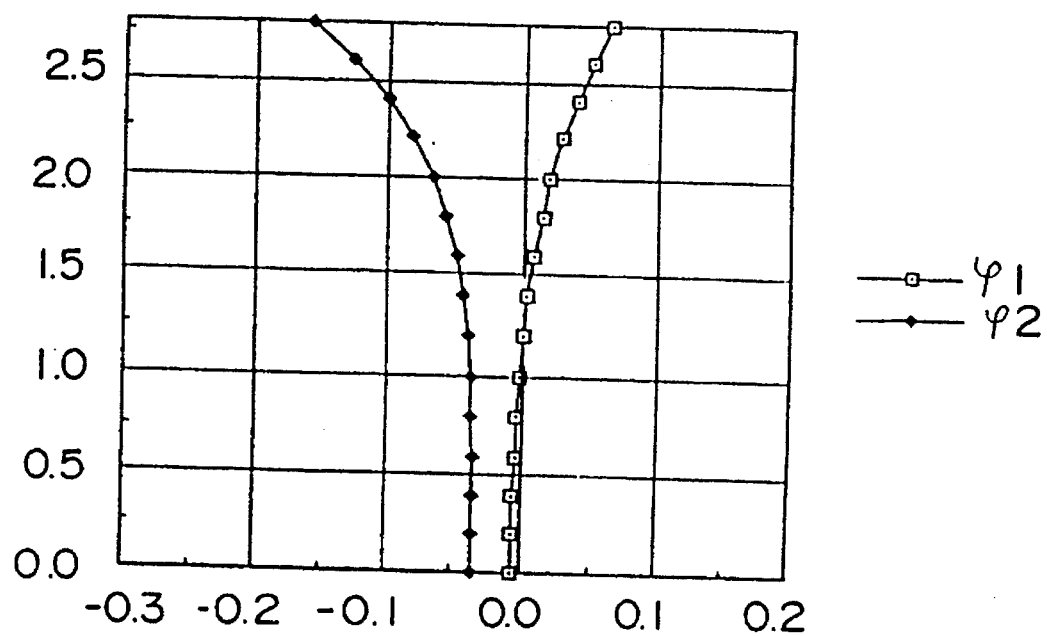
FIG. 49 is a diagram showing a variation of power depending on an image height of a first lens, according to a fifth embodiment of the present invention.
Figure 50:
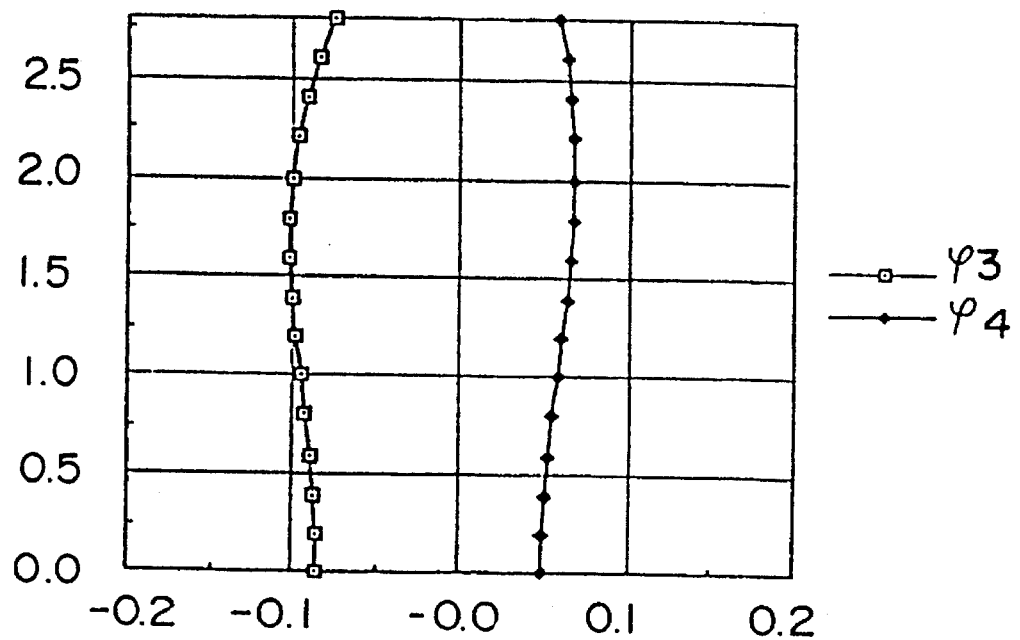
FIG. 50 is a diagram showing a variation of power depending on an image height of a second lens, according to a fifth embodiment of the present invention.

FIGS. 49 and 50 show the power change in the aspheric surfaces of the first and second lenses, in accordance with the image height, corresponding to the fifth embodiment shown in FIGS. 17 and 19. In FIGS. 49 and 50, the powers of the first and second lens surfaces of the first lens, and the first and second lens surfaces of the second lens are designated by ψ1 and ψ2, and ψ3 and ψ4, respectively.

Figure 52A:
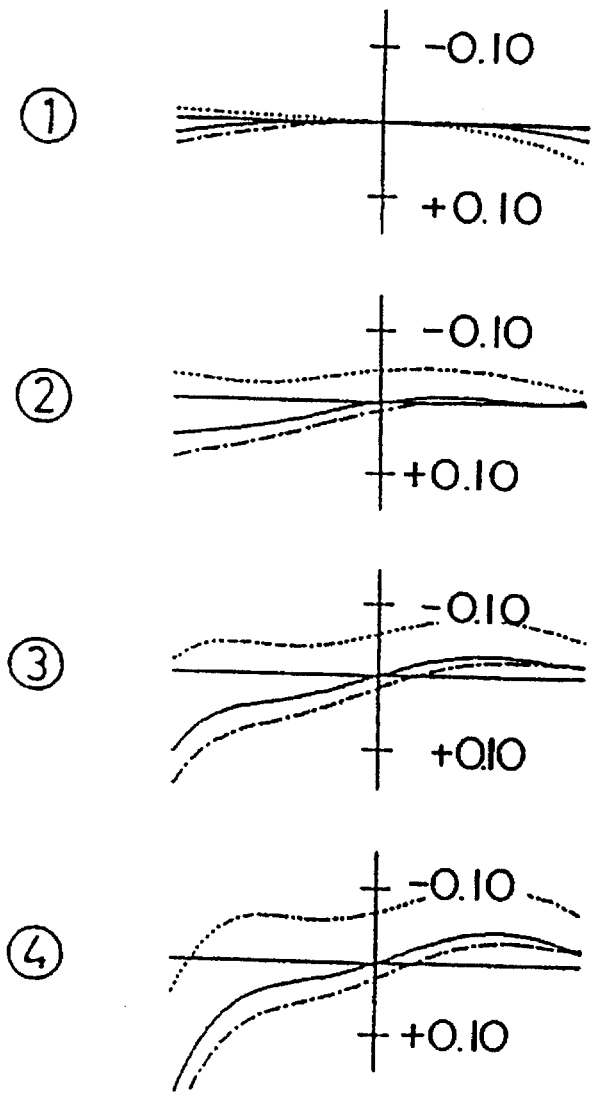
Figure 52B:
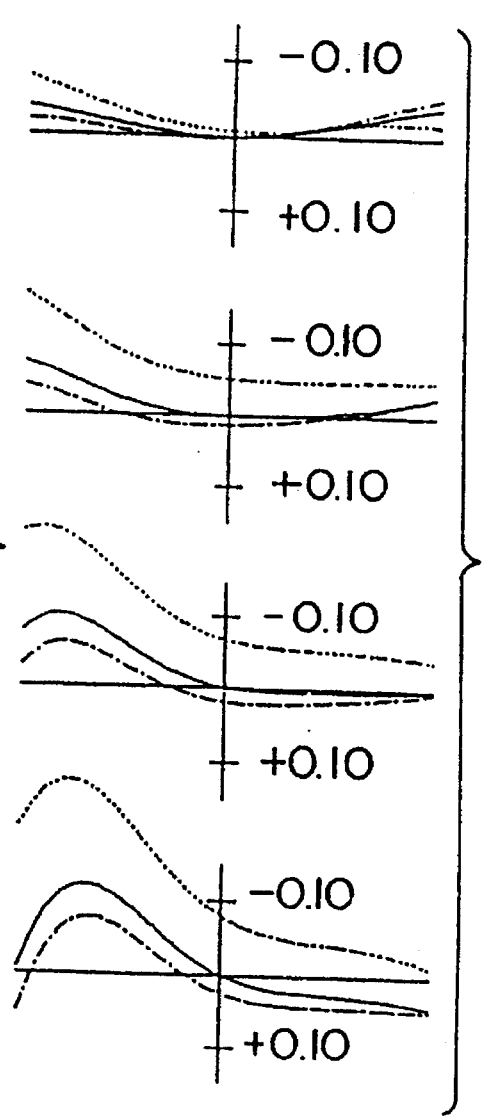

FIGS. 51 (51(a), 51(b), and 51(c)) and 52 (52(a) and 52(b)) show lateral aberrations at a high magnification, according to the fifth embodiment of the present invention. FIG. 51(a) shows aberration according to design values of the lens (i.e., absence of eccentricity), FIG. 51(b) the case where the first lens is eccentric by 0.1 mm, and FIG. 51(c) the case where the second lens is eccentric by 0.1 mm. FIG. 52(a) shows the case where there is a surface eccentricity of the first lens surface of the first lens of 0.05 mm, and FIG. 52(b) the case where there is a surface eccentricity of the second lens surface of the first lens of 0.05 mm, respectively.

Below, Table 28 shows the values of the conditions mentioned above in the respective embodiments, by way of example.

Table 29 below also shows the values of the conditions 8 mentioned above in the respective embodiments, by way of example.

Table 30 below shows the values of the conditions 4 mentioned above in the respective embodiments, by way of example.

Figure 53A:
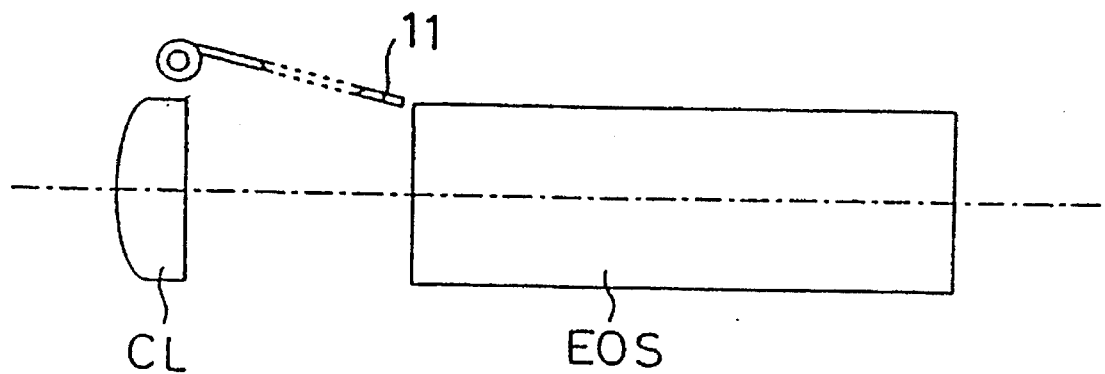
Figure 53B:
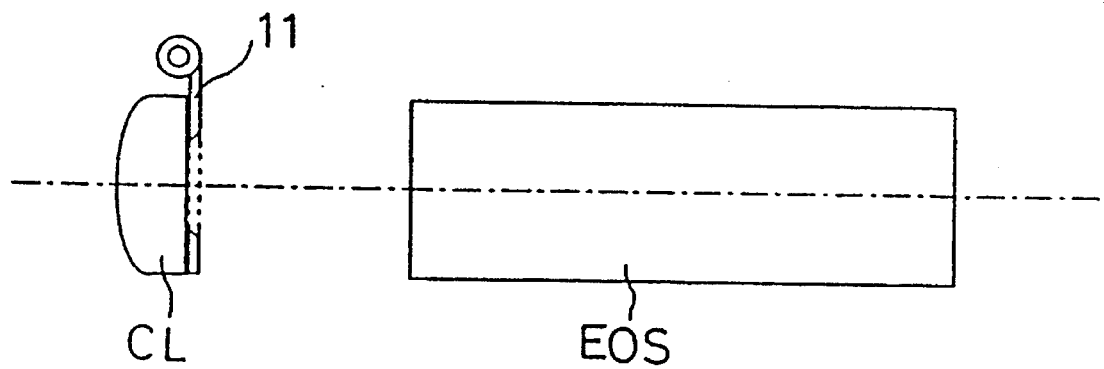
Figure 54A:
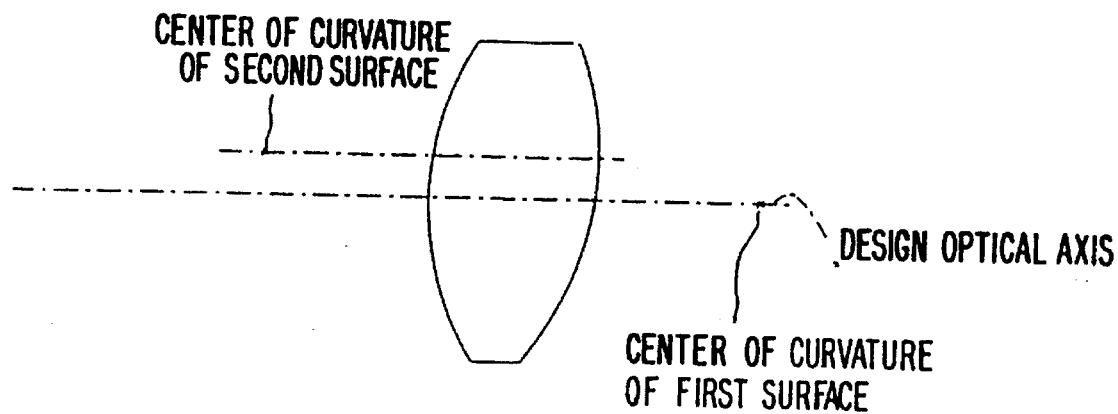
Figure 54B:
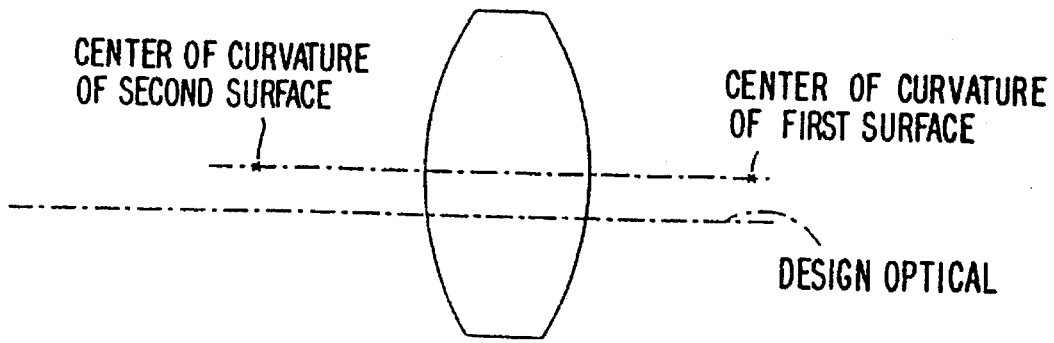

By satisfying condition No. 7, as described above, a sufficient distance will be secured between the condenser lens CL and the erect image optical system EOS (see FIGS. 53(a) and 53(b)). Therefore, a field frame 11 can be inserted in and retracted from the space therebetween. FIGS. 53(a) and 53(b) are illustrative views showing the manner in which field frame 11, which is used for panoramic photography, is inserted in and retracted from the vicinity of the object image formed by the objective optical system.

As can be seen from the above discussion, according to the present invention, the half angle of view of the objective lens system on the short focal length side can be increased without increasing the length of the view finder.

Furthermore, according to the present invention, a large space for accommodating the image erecting optical system can be obtained while lowering the angular magnification of the view finder. It is also possible to provide a space between the object image formed by the objective lens system and the image erecting optical system that is large enough to retractably insert therein the field frame, so that a panoramic photographing function may be effected.

Finally, according to the present invention, an aspheric lens system can be provided wherein, if an error occurs in the lens, such as eccentrically (i.e., deviation from the design values), little or no deterioration of the optical efficiency will occur.

TABLE 1

| Surface NO. | EP = 10 mm | Diopter −1.1 Dpt | | |
| --- | --- | --- | --- | --- |
| | r | d | n | ν |
| 1 | ∞ | 1.50 | 1.49176 | 57.4 |
| 2 | ∞ | Variable | | |
| 3 | −28.827 | 1.50 | 1.58547 | 29.9 |
| 4 | 90.862 | 2.68 | | |
| 5 | −40.860 | 2.14 | 1.49176 | 57.4 |
| 6 | 23.508 | Variable | | |
| 7 | 8.490 | 2.19 | 1.54350 | 54.3 |
| 8 | −10.830 | 0.22 | | |
| 9 | −10.612 | 1.20 | 1.58547 | 29.9 |
| 10 | −21.916 | Variable | | |
| 11 | 7.285 | 1.50 | 1.49176 | 57.4 |
| 12 | 8.337 | 2.82 | | |
| 13 | 8.313 | 2.19 | 1.49176 | 57.4 |
| 14 | ∞ | 6.80 | | |
| 15 | ∞ | 23.00 | 1.49176 | 57.4 |
| 16 | ∞ | 1.50 | | |
| 17 | 12.738 | 2.70 | 1.49176 | 57.4 |
| 18 | −22.297 | 1.35 | | |
| 19 | 18.004 | 1.50 | 1.58547 | 29.9 |
| 20 | 10.593 | | | |

TABLE 2

| 3rd surface | 4th surface | 5th surface |
| --- | --- | --- |
| K = 0 | K = 0 | K = 0 |
| A4 = 0.13304085 × $10^{-2}$ | A4 = 0.20042032 × $10^{-2}$ | A4 = −0.15509821 × $10^{-3}$ |
| A6 = 0.50187403 × $10^{-4}$ | A6 = 0.65821787 × $10^{-4}$ | A6 = 0.52784354 × $10^{-4}$ |
| A8 = −0.10191957 × $10^{-5}$ | A8 = 0.48330579 × $10^{-5}$ | A8 = −0.73439660 × $10^{-6}$ |
| 6th surface | 7th surface | 10th surface |

TABLE 2-continued

| | | |
|---|---|---|
| $K = 0$ | $K = 0$ | $K = 0$ |
| $A4 = -0.60380727 \times 10^{-3}$ | $A4 = 0.45866792 \times 10^{-3}$ | $A4 = 0.78514644 \times 10^{-3}$ |
| $A6 = 0.10815769 \times 10^{-4}$ | $A6 = 0.36680910 \times 10^{-4}$ | $A6 = 0.61706389 \times 10^{-4}$ |
| $A8 = -0.99348329 \times 10^{-6}$ | $A8 = -0.78931843 \times 10^{-6}$ | $A8 = -0.23187680 \times 10^{-6}$ |
| 11th surface | 13th surface | 18th surface |
| $K = 0$ | $K = 0$ | $K = 0$ |
| $A4 = -0.73107130 \times 10^{-5}$ | $A4 = -0.82148229 \times 10^{-3}$ | $A4 = 0.16076273 \times 10^{-3}$ |
| $A6 = 0.14307795 \times 10^{-5}$ | $A6 = 0.13529496 \times 10^{-4}$ | $A6 = -0.54013387 \times 10^{-6}$ |
| $A8 = 0$ | $A8 = -0.54305623 \times 10^{-6}$ | $A8 = 0$ |

TABLE 3

| M | 0.34× | 0.87× |
|---|---|---|
| ω | 32° | 13° |
| d2 | 0.55 | 0.96 |
| d6 | 13.16 | 1.27 |
| d10 | 10.99 | 22.47 |

TABLE 4

| | EP = 10 mm | Diopter −1.1 Dpt | | |
|---|---|---|---|---|
| Surface NO. | r | d | n | ν |
| 1 | ∞ | 1.50 | 1.49176 | 57.4 |
| 2 | ∞ | Variable | | |
| 3 | −25.928 | 1.50 | 1.58547 | 29.9 |
| 4 | 68.658 | 2.76 | | |
| 5 | −28.629 | 1.81 | 1.49176 | 57.4 |
| 6 | 38.021 | Variable | | |
| 7 | 8.925 | 2.22 | 1.49176 | 57.4 |
| 8 | −9.140 | 0.20 | | |
| 9 | −10.421 | 1.20 | 1.58547 | 29.9 |
| 10 | −17.657 | Variable | | |
| 11 | 5.997 | 1.50 | 1.49176 | 57.4 |
| 12 | 6.421 | 2.83 | | |
| 13 | 8.729 | 2.08 | 1.49176 | 57.4 |
| 14 | ∞ | 6.80 | | |
| 15 | ∞ | 23.00 | 1.49176 | 57.4 |
| 16 | ∞ | 1.40 | | |
| 17 | 13.023 | 2.70 | 1.49176 | 57.4 |
| 18 | −21.122 | 1.70 | | |
| 19 | 17.719 | 2.00 | 1.58547 | 29.9 |
| 20 | 10.232 | | | |

TABLE 5

| 3rd surface | 4th surface | 5th surface |
|---|---|---|
| $K = 0$ | $K = 0$ | $K = 0$ |
| $A4 = 0.17051129 \times 10^{-2}$ | $A4 = 0.24651572 \times 10^{-2}$ | $A4 = -0.19387819 \times 10^{-3}$ |
| $A6 = 0.38794797 \times 10^{-4}$ | $A6 = 0.58617588 \times 10^{-4}$ | $A6 = 0.62659412 \times 10^{-4}$ |
| $A8 = -0.91553313 \times 10^{-6}$ | $A8 = 0.60768468 \times 10^{-5}$ | $A8 = -0.11950801 \times 10^{-5}$ |
| 6th surface | 7th surface | 10th surface |
| $K = 0$ | $K = 0$ | $K = 0$ |
| $A4 = -0.65345396 \times 10^{-3}$ | $A4 = 0.27172307 \times 10^{-3}$ | $A4 = 0.54174898 \times 10^{-3}$ |
| $A6 = 0.11935420 \times 10^{-4}$ | $A6 = 0.30741844 \times 10^{-4}$ | $A6 = 0.53299616 \times 10^{-4}$ |
| $A8 = -0.97281825 \times 10^{-6}$ | $A8 = -0.96741706 \times 10^{-6}$ | $A8 = -0.10735978 \times 10^{-5}$ |
| 11th surface | 13th surface | 18th surface |
| $K = 0$ | $K = 0$ | $K = 0$ |
| $A4 = 0.80959032 \times 10^{-5}$ | $A4 = -0.79193576 \times 10^{-3}$ | $A4 = 0.15199043 \times 10^{-3}$ |
| $A6 = -0.66949927 \times 10^{-5}$ | $A6 = 0.24307185 \times 10^{-4}$ | $A6 = -0.41551814 \times 10^{-6}$ |
| $A8 = 0$ | $A8 = -0.10043613 \times 10^{-5}$ | $A8 = 0$ |

TABLE 6

| M | 0.34× | 0.87× |
|---|---|---|
| ω | 32° | 13° |
| d2 | 0.55 | 1.06 |
| d6 | 13.34 | 1.28 |
| d10 | 11.25 | 22.80 |

TABLE 7

| | EP = 9 mm | Diopter −1.1 Dpt | | |
|---|---|---|---|---|
| Surface NO. | r | d | n | ν |
| 1 | ∞ | 1.50 | 1.49176 | 57.4 |
| 2 | ∞ | Variable | | |
| 3 | 93.777 | 1.50 | 1.58547 | 29.9 |
| 4 | 6.760 | 3.32 | | |
| 5 | −6.471 | 1.50 | 1.49176 | 57.4 |
| 6 | −9.337 | 0.10 | | |
| 7 | 59.503 | 1.50 | 1.58547 | 29.9 |
| 8 | −305.046 | Variable | | |
| 9 | 5.631 | 2.18 | 1.54350 | 54.3 |
| 10 | −7.847 | 0.36 | | |
| 11 | −7.402 | 2.10 | 1.58547 | 29.9 |
| 12 | −779.225 | Variable | | |
| 13 | 5.719 | 2.01 | 1.49176 | 57.4 |
| 14 | 6.068 | 2.32 | | |
| 15 | 5.886 | 2.30 | 1.49176 | 57.4 |
| 16 | ∞ | 3.34 | | |
| 17 | ∞ | 19.80 | 1.49176 | 57.4 |
| 18 | ∞ | 0.50 | | |

TABLE 7-continued

| | EP = 9 mm | | Diopter −1.1 Dpt | |
|---|---|---|---|---|
| Surface NO. | r | d | n | ν |
| 19 | 13.967 | 2.70 | 1.49176 | 57.4 |
| 20 | −18.087 | 0.50 | | |
| 21 | 10.257 | 1.50 | 1.58547 | 29.9 |
| 22 | 8.742 | | | |

TABLE 8

| 3rd surface | 4th surface | 8th surface |
|---|---|---|
| K = 0 | K = 0 | K = 0 |
| A4 = 0.21720825 × $10^{-2}$ | A4 = 0.49047491 × $10^{-2}$ | A4 = −0.54274263 × $10^{-3}$ |
| A6 = 0.78226062 × $10^{-4}$ | A6 = −0.62741871 × $10^{-4}$ | A6 = −0.12822498 × $10^{-3}$ |
| A8 = −0.1879068 × $10^{-5}$ | A8 = 0.74095626 × $10^{-4}$ | A8 = 0.12490262 × $10^{-4}$ |
| 9th surface | 12th surface | 13th surface |
| K = 0 | K = 0 | K = 0 |
| A4 = 0.28204214 × $10^{-3}$ | A4 = 0.19233201 × $10^{-2}$ | A4 = 0.42123353 × $10^{-3}$ |
| A6 = −0.49880450 × $10^{-4}$ | A6 = 0.96361351 × $10^{-4}$ | A6 = −0.43568062 × $10^{-5}$ |
| A8 = 0.84861394 × $10^{-6}$ | A8 = −0.10335280 × $10^{-4}$ | A8 = 0 |
| 15th surface | 20th surface | |
| K = 0 | K = 0 | |
| A4 = −0.21919968 × $10^{-2}$ | A4 = 0.10685156 × $10^{-3}$ | |
| A6 = 0.19395481 × $10^{-4}$ | A6 = 0.76527936 × $10^{-6}$ | |
| A8 = −0.13455724 × $10^{-5}$ | A8 = 0 | |

TABLE 9

| M | 0.35× | 0.51× |
|---|---|---|
| ω | 31° | 23° |
| d2 | 0.55 | 2.10 |
| d8 | 8.45 | 3.52 |
| d12 | 7.62 | 11.00 |

TABLE 10

| | EP = 11.4 mm | | Diopter −1.0 Dpt | |
|---|---|---|---|---|
| Surface NO. | r | d | n | ν |
| 1 | ∞ | 2.00 | 1.49176 | 57.4 |
| 2 | ∞ | 1.50 | | |
| 3 | 52106.692 | 1.50 | 1.58547 | 29.9 |
| 4 | 14.805 | Variable | | |
| 5 | −6.388 | 1.23 | 1.49176 | 57.4 |
| 6 | −12.009 | Variable | | |

TABLE 10-continued

| | EP = 11.4 mm | | Diopter −1.0 Dpt | |
|---|---|---|---|---|
| Surface NO. | r | d | n | ν |
| 7 | 10.632 | 3.62 | 1.49176 | 57.4 |
| 8 | −5.201 | 0.02 | | |
| 9 | −5.201 | 1.20 | 1.58547 | 29.9 |
| 10 | −9.577 | Variable | | |
| 11 | 11.694 | 2.84 | 1.49176 | 57.4 |
| 12 | ∞ | 3.00 | | |
| 13 | ∞ | 23.14 | 1.49176 | 57.4 |
| 14 | ∞ | 1.30 | | |
| 15 | 22.896 | 2.74 | 1.49176 | 57.4 |
| 16 | −18.545 | 1.65 | | |
| 17 | ∞ | 1.00 | 1.49176 | 57.4 |
| 18 | ∞ | | | |

TABLE 11

| 3rd surface | 4th surface | 5th surface |
|---|---|---|
| K = 0 | K = 0 | K = 0 |
| A4 = −0.83398200 × $10^{-4}$ | A4 = −0.98585200 × $10^{-5}$ | A4 = 0.37014500 × $10^{-3}$ |
| A6 = 0.32426000 × $10^{-4}$ | A6 = 0.17042500 × $10^{-4}$ | A6 = −0.12791000 × $10^{-4}$ |
| A8 = −0.24729400 × $10^{-6}$ | A8 = 0.19647000 × $10^{-5}$ | A8 = 0.10359900 × $10^{-5}$ |
| 7th surface | 10th surface | 11th surface |
| K = 0 | K = 0 | K = 0 |
| A4 = −0.67100900 × $10^{-4}$ | A4 = 0.32668600 × $10^{-3}$ | A4 = 0.25805500 × $10^{-2}$ |
| A6 = 0.75037100 × $10^{-5}$ | A6 = −0.12012400 × $10^{-5}$ | A6 = −0.21509200 × $10^{-3}$ |
| A8 = 0.99663000 × $10^{-6}$ | A8 = 0.29549700 × $10^{-6}$ | A8 = 0.45708500 × $10^{-5}$ |
| 15th surface | | |
| K = 0 | | |
| A4 = −0.85650900 × $10^{-4}$ | | |

TABLE 11-continued $A6 = 0.33133300 \times 10^{-7}$
$A8 = 0$

TABLE 12

| M | 0.35× | 0.88× |
|---|---|---|
| ω | 32° | 13° |
| d4 | 3.54 | 3.95 |
| d6 | 13.24 | 1.48 |
| d10 | 15.73 | 27.07 |

TABLE 13

| | EP = 10.0 mm | | Diopter −1.0 Dpt | |
|---|---|---|---|---|
| Surface NO. | r | d | n | ν |
| 1 | ∞ | 1.50 | 1.49176 | 57.4 |
| 2 | ∞ | Variable | | |
| 3 | −99.016 | 1.50 | 1.58547 | 29.9 |
| 4 | 16.655 | 3.25 | | |
| 5 | −6.849 | 1.50 | 1.49176 | 57.4 |
| 6 | −12.077 | Variable | | |
| 7 | 6.280 | 2.70 | 1.49176 | 57.4 |
| 8 | −9.199 | 0.10 | | |
| 9 | 18.339 | 1.20 | 1.58547 | 29.9 |
| 10 | 6.636 | Variable | | |
| 11 | 10.714 | 3.00 | 1.49176 | 57.4 |
| 12 | ∞ | 6.80 | | |
| 13 | ∞ | 23.00 | 1.49176 | 57.4 |
| 14 | ∞ | 2.00 | | |
| 15 | 13.434 | 2.71 | 1.49176 | 57.4 |
| 16 | −28.054 | 1.70 | | |
| 17 | 14.602 | 2.21 | 1.58547 | 29.9 |
| 18 | 10.000 | | | |

TABLE 14

| 3rd surface | 4th surface | 5th surface |
|---|---|---|
| K = 0 | K = 0 | K = 0 |
| $A4 = 0.48696527 \times 10^{-3}$ | $A4 = 0.33563204 \times 10^{-3}$ | $A4 = -0.18346250 \times 10^{-2}$ |
| $A6 = 0.47800406 \times 10^{-4}$ | $A6 = 0.55758065 \times 10^{-4}$ | $A6 = 0.11751226 \times 10^{-3}$ |
| $A8 = -0.53602476 \times 10^{-6}$ | $A8 = 0.41814929 \times 10^{-5}$ | $A8 = -0.12386343 \times 10^{-5}$ |
| 6th surface | 7th surface | 10th surface |
| K = 0 | K = 0 | K = 0 |
| $A4 = -0.12659367 \times 10^{-2}$ | $A4 = -0.77171759 \times 10^{-3}$ | $A4 = 0.72323597 \times 10^{-3}$ |
| $A6 = 0.57233484 \times 10^{-4}$ | $A6 = -0.31552902 \times 10^{-4}$ | $A6 = 0.55079160 \times 10^{-5}$ |
| $A8 = -0.25340844 \times 10^{-6}$ | $A8 = 0.37181436 \times 10^{-6}$ | $A8 = -0.16031890 \times 10^{-5}$ |
| 11th surface | 16th surface | |
| K = 0 | K = 0 | |
| $A4 = 0.11728471 \times 10^{-3}$ | $A4 = 0.10114791 \times 10^{-3}$ | |
| $A6 = -0.46239682 \times 10^{-5}$ | $A6 = -0.13207013 \times 10^{-6}$ | |
| $A8 = 0$ | $A8 = 0$ | |

TABLE 15

| M | 0.34× | 0.84× |
|---|---|---|
| ω | 32° | 13° |
| d2 | 0.55 | 1.54 |
| d6 | 13.96 | 2.30 |
| d10 | 13.15 | 23.83 |

TABLE 16

| | EP = 10.7 mm | | Diopter −0.96 Dpt | |
|---|---|---|---|---|
| Surface NO. | r | d | n | ν |
| 1 | ∞ | 1.50 | 1.49176 | 57.4 |
| 2 | ∞ | Variable | | |
| 3 | −78.822 | 1.50 | 1.58547 | 29.9 |
| 4 | 28.296 | 2.54 | | |
| 5 | 31.670 | 1.90 | 1.49176 | 57.4 |
| 6 | 10.116 | Variable | | |
| 7 | 10.744 | 2.17 | 1.49176 | 57.4 |
| 8 | −7.033 | 0.10 | | |
| 9 | −11.065 | 1.00 | 1.58547 | 29.9 |
| 10 | −24.387 | Variable | | |
| 11 | 6.392 | 2.33 | 1.49176 | 57.4 |
| 12 | 7.326 | 2.26 | | |
| 13 | 10.981 | 1.59 | 1.49176 | 57.4 |
| 14 | ∞ | 6.80 | | |
| 15 | ∞ | 23.00 | 1.49176 | 57.4 |
| 16 | ∞ | 1.40 | | |
| 17 | 15.499 | 2.71 | 1.49176 | 57.4 |
| 18 | −25.133 | 1.70 | | |
| 19 | 13.317 | 2.21 | 1.58547 | 29.9 |
| 20 | 10.000 | | | |

TABLE 17

| 3rd surface | 4th surface | 5th surface |
|---|---|---|
| K = 0<br>A4 = 0.93324675 × 10$^{-3}$<br>A6 = 0.18433007 × 10$^{-4}$<br>A8 = −0.30157890 × 10$^{-6}$ | K = 0<br>A4 = 0.90455194 × 10$^{-3}$<br>A6 = 0.70627924 × 10$^{-4}$<br>A8 = −0.51958348 × 10$^{-6}$ | K = 0<br>A4 = −0.20794531 × 10$^{-2}$<br>A6 = 0.94284521 × 10$^{-4}$<br>A8 = −0.21366980 × 10$^{-5}$ |
| 6th surface | 7th surface | 10th surface |
| K = 0<br>A4 = −0.22098978 × 10$^{-2}$<br>A6 = 0.72579298 × 10$^{-4}$<br>A8 = −0.19858908 × 10$^{-5}$ | K = 0<br>A4 = −0.36067190 × 10$^{-3}$<br>A6 = −0.83711849 × 10$^{-5}$<br>A8 = −0.64414696 × 10$^{-6}$ | K = 0<br>A4 0.18557237 × 10$^{-3}$<br>A6 = 0.80469356 × 10$^{-5}$<br>A8 = −0.11070386 × 10$^{-5}$ |
| 11th surface | 13th surface | 18th surface |
| K = 0<br>A4 = 0.11752820 × 10$^{-3}$<br>A6 = −0.15426801 × 10$^{-4}$<br>A8 = 0 | K = 0<br>A4 = −0.33307966 × 10$^{-2}$<br>A6 = 0.18300226 × 10$^{-3}$<br>A8 = −0.33900935 × 10$^{-5}$ | K = 0<br>A4 = 0.81399525 × 10$^{-4}$<br>A6 = −0.28696544 × 10$^{-6}$<br>A8 = 0 |

TABLE 18

| M | 0.34× | 0.86× |
|---|---|---|
| ω | 32° | 13° |
| d2 | 0.50 | 0.52 |
| d6 | 13.37 | 1.84 |
| d10 | 11.69 | 23.21 |

TABLE 19

| EP = 10.7 mm | | Diopter −0.95 Dpt | |
|---|---|---|---|
| Surface NO. | r | d | n | v |

| Surface NO. | r | d | n | v |
|---|---|---|---|---|
| 1 | ∞ | 1.50 | 1.49176 | 57.4 |
| 2 | ∞ | 0.55 | | |
| 3 | −82.665 | 1.50 | 1.58547 | 29.9 |

TABLE 19-continued

| EP = 10.7 mm | | Diopter −0.95 Dpt | |
|---|---|---|---|
| Surface NO. | r | d | n | v |
| 4 | 30.845 | 2.73 | | |
| 5 | 44.674 | 2.00 | 1.49176 | 57.4 |
| 6 | 10.718 | Variable | | |
| 7 | 10.744 | 2.17 | 1.49176 | 57.4 |
| 8 | −7.033 | 0.10 | | |
| 9 | −11.065 | 1.00 | 1.58547 | 29.9 |
| 10 | −24.387 | Variable | | |
| 11 | 6.392 | 2.33 | 1.49176 | 57.4 |
| 12 | 7.326 | 2.26 | | |
| 13 | 10.981 | 1.59 | 1.49176 | 57.4 |
| 14 | ∞ | 6.80 | | |
| 15 | ∞ | 23.00 | 1.49176 | 57.4 |
| 16 | ∞ | 1.40 | | |
| 17 | 15.499 | 2.71 | 1.49176 | 57.4 |
| 18 | −25.133 | 1.70 | | |
| 19 | 13.317 | 2.21 | 1.58547 | 29.9 |
| 20 | 10.000 | | | |

TABLE 20

| 3rd surface | 4th surface | 5th surface |
|---|---|---|
| K = 0<br>A4 = 0.11894340 × 10$^{-2}$<br>A6 = −0.16465858 × 10$^{-5}$<br>A8 = 0.84510254 × 10$^{-7}$ | K = 0<br>A4 = 0.14455307 × 10$^{-2}$<br>A6 = 0.14253204 × 10$^{-4}$<br>A8 = 0.45924602 × 10$^{-6}$ | K = 0<br>A4 = −0.14194920 × 10$^{-2}$<br>A6 = 0.35202729 × 10$^{-5}$<br>A8 = 0.37447599 × 10$^{-6}$ |
| 6th surface | 7th surface | 10th surface |
| K = 0<br>A4 = −0.17219345 × 10$^{-2}$<br>A6 = 0.53309818 × 10$^{-5}$<br>A8 = 0.81192110 × 10$^{-6}$ | K = 0<br>A4 = −0.36067190 × 10$^{-3}$<br>A6 = −0.83711849 × 10$^{-5}$<br>A8 = −0.64414696 × 10$^{-6}$ | K = 0<br>A4 = 0.18557237 × 10$^{-3}$<br>A6 = 0.80469356 × 10$^{-5}$<br>A8 = −0.11070386 × 10$^{-5}$ |
| 11th surface | 13th surface | 18th surface |
| K = 0<br>A4 = 0.11752820 × 10$^{-3}$<br>A6 = −0.15426801 × 10$^{-4}$<br>A8 = 0 | K = 0<br>A4 = −0.33307966 × 10$^{-2}$<br>A6 = 0.18300226 × 10$^{-3}$<br>A8 = −0.33900935 × 10$^{-5}$ | K = 0<br>A4 = 0.81399525 × 10$^{-4}$<br>A6 = −0.28696544 × 10$^{-6}$<br>A8 = 0 |

TABLE 21

| M | 0.34× | 0.86× |
|---|---|---|
| ω | 32° | 13° |
| d6 | 13.25 | 1.79 |

TABLE 21-continued

| d10 | 11.72 | 23.19 |
|---|---|---|

TABLE 22

| EP = 10.0 mm | | Diopter −1.0 Dpt | |
|---|---|---|---|

| Surface NO. | r | d | n | v |
|---|---|---|---|---|
| 1 | ∞ | 1.50 | 1.49176 | 57.4 |
| 2 | ∞ | Variable | | |
| 3 | −100.839 | 1.50 | 1.58547 | 29.9 |
| 4 | 21.799 | 2.48 | | |
| 5 | 6.367 | 1.31 | 1.49176 | 57.4 |
| 6 | 4.535 | Variable | | |
| 7 | 9.495 | 2.47 | 1.49176 | 57.4 |
| 8 | −6.246 | 0.10 | | |
| 9 | −6.336 | 1.00 | 1.58547 | 29.9 |
| 10 | −11.983 | Variable | | |
| 11 | 6.387 | 2.50 | 1.49176 | 57.4 |
| 12 | 7.500 | 2.34 | | |
| 13 | 9.670 | 1.59 | 1.49176 | 57.4 |
| 14 | ∞ | 6.80 | | |
| 15 | ∞ | 23.00 | 1.49176 | 57.4 |
| 16 | ∞ | 2.50 | | |
| 17 | 13.251 | 2.90 | 1.49176 | 57.4 |
| 18 | −31.119 | 1.70 | | |
| 19 | 10.314 | 2.21 | 1.58547 | 29.9 |
| 20 | 7.508 | | | |

TABLE 23

| 3rd surface | 4th surface | 5th surface |
|---|---|---|
| $K = 0$ | $K = 0$ | $K = 0$ |
| $A4 = 0.14976894 \times 10^{-2}$ | $A4 = 0.15857079 \times 10^{-2}$ | $A4 = -0.52884380 \times 10^{-2}$ |
| $A6 = 0.25977485 \times 10^{-4}$ | $A6 = 0.10468463 \times 10^{-3}$ | $A6 = 0.32149309 \times 10^{-3}$ |
| $A8 = -0.51104385 \times 10^{-6}$ | $A8 = 0.23705531 \times 10^{-5}$ | $A8 = -0.89057325 \times 10^{-5}$ |
| 6th surface | 7th surface | 10th surface |
| $K = 0$ | $K = 0$ | $K = 0$ |
| $A4 = -0.73605553 \times 10^{-2}$ | $A4 = 0.20012475 \times 10^{-4}$ | $A4 = 0.37204494 \times 10^{-3}$ |
| $A6 = 0.37675450 \times 10^{-3}$ | $A6 = 0.40581101 \times 10^{-4}$ | $A6 = 0.21635942 \times 10^{-4}$ |
| $A8 = -0.16713831 \times 10^{-4}$ | $A8 = -0.93440578 \times 10^{-6}$ | $A8 = 0.51862788 \times 10^{-6}$ |
| 11th surface | 13th surface | 18th surface |
| $K = 0$ | $K = 0$ | $K = 0$ |
| $A4 = -0.65604440 \times 10^{-4}$ | $A4 = -0.28313026 \times 10^{-2}$ | $A4 = 0.84839627 \times 10^{-4}$ |
| $A6 = -0.77682462 \times 10^{-5}$ | $A6 = 0.12174047 \times 10^{-3}$ | $A6 = -0.12225598 \times 10^{-6}$ |
| $A8 = 0$ | $A8 = -0.22515717 \times 10^{-5}$ | $A8 = 0$ |

TABLE 24

| M | 0.33× | 0.86× |
|---|---|---|
| ω | 33° | 13° |
| d2 | 0.55 | 1.07 |
| d6 | 13.93 | 1.87 |
| d10 | 10.94 | 22.49 |

TABLE 25

| EP = 10.0 mm | | Diopter −0.99 Dpt | |
|---|---|---|---|

| Surface NO. | r | d | n | v |
|---|---|---|---|---|
| 1 | ∞ | 1.50 | 1.49176 | 57.4 |
| 2 | ∞ | Variable | | |
| 3 | −98.824 | 1.50 | 1.58547 | 29.9 |
| 4 | 17.749 | 3.35 | | |
| 5 | −6.317 | 1.50 | 1.49176 | 57.4 |
| 6 | −11.268 | Variable | | |
| 7 | 6.157 | 2.70 | 1.49176 | 57.4 |
| 8 | −9.564 | 0.10 | | |
| 9 | 12.755 | 1.20 | 1.58547 | 29.9 |
| 10 | 5.540 | Variable | | |
| 11 | 11.413 | 3.00 | 1.49176 | 57.4 |
| 12 | ∞ | 6.80 | | |
| 13 | ∞ | 23.00 | 1.49176 | 57.4 |
| 14 | ∞ | 2.00 | | |
| 15 | 14.055 | 2.71 | 1.49176 | 57.4 |
| 16 | −27.997 | 1.70 | | |
| 17 | 14.036 | 2.21 | 1.58547 | 29.9 |
| 18 | 10.000 | | | |

TABLE 26

| 3rd surface | 4th surface | 6th surface |
|---|---|---|
| $K = 0$ | $K = 0$ | $K = 0$ |
| $A4 = 0.14395499 \times 10^{-2}$ | $A4 = 0.17289019 \times 10^{-2}$ | $A4 = -0.18272497 \times 10^{-3}$ |
| $A6 = 0.66191269 \times 10^{-5}$ | $A6 = 0.40004633 \times 10^{-4}$ | $A6 = -0.24391092 \times 10^{-4}$ |
| $A8 = 0.43410326 \times 10^{-6}$ | $A8 = 0.25275607 \times 10^{-5}$ | $A8 = 0.56056403 \times 10^{-6}$ |
| 7th surface | 10th surface | 11th surface |

TABLE 26-continued

| K = 0 | K = 0 | K = 0 |
|---|---|---|
| A4 = −0.83060514 × 10⁻³ | A4 = 0.50187460 × 10⁻³ | A4 = 0.41050257 × 10⁻³ |
| A6 = −0.22185483 × 10⁻⁴ | A6 = 0.18080908 × 10⁻⁴ | A6 = −0.11104580 × 10⁻⁴ |
| A8 = −0.39762888 × 10⁻⁶ | A8 = −0.39768757 × 10⁻⁵ | A8 = 0 |
| 16th surface | | |

K = 0
A4 = 0.96054430 × 10⁻⁴
A6 = −0.51280855 × 10⁻⁶
A8 = 0

TABLE 27

| M | 0.34× | 0.86× |
|---|---|---|
| ω | 32° | 13° |
| d2 | 0.55 | 1.31 |
| d6 | 14.21 | 2.66 |
| d10 | 13.15 | 23.94 |

TABLE 28

| | Embodiment 5 | Embodiment 6 | Embodiment 7 | Embodiment 9 |
|---|---|---|---|---|
| SF1 | 0.71 | −0.47 | −0.46 | −0.695 |
| |SF2| | 3.62 | 1.94 | 1.63 | 3.48 |
| |SP1| | 0.070 | 0.066 | 0.065 | 0.070 |
| |SP2| | 0.123 | 0.106 | 0.093 | 0.124 |
| |SP3| | 0.026 | 0.046 | 0.068 | 0.026 |
| |SP4| | 0.018 | 0.067 | 0.070 | 0.018 |

TABLE 29

| | Embodiment 1 | Embodiment 2 | Embodiment 3 | Embodiment 4 | |
|---|---|---|---|---|---|
| ΔX1/fOS | 0.270 | 0.277 | 0.209 | 0.065 | |
| ΔX2/fOS | 0.230 | 0.231 | 0.162 | 0.035 | |
| | Embodiment 5 | Embodiment 6 | Embodiment 7 | Embodiment 8 | Embodiment 9 |
| ΔX1/fOS | 0.145 | 0.188 | 0.212 | 0.290 | 0.161 |
| ΔX2/fOS | 0.085 | 0.134 | 0.141 | 0.239 | 0.103 |

TABLE 30

| | Embodiment 1 | Embodiment 2 | Embodiment 3 |
|---|---|---|---|
| fE/fEN | −0.48 | −0.48 | −0.11 |
| fE/rE | 2.13 | 2.14 | 1.94 |
| LE/fE | 0.30 | 0.31 | 0.20 |
| fBE/fE | 1.05 | 1.08 | 1.01 |

What is claimed is:

1. An optical system comprising a first lens element having two aspheric lens surfaces, and a second lens element having at least one aspheric lens surface, said first and said second lens elements satisfying the following relationships:

$|SF1|<1$ $0 \leq ||SF1|-|SF2|| \leq 4$ wherein SF1 designates a shape factor of said first lens element, and SF2 designates a shape factor of said second lens element, and wherein a shape factor SF is defined by $SF=(r1+r2)/(r2-r1)$, r1 and r2 designating respective radii of curvature of opposite lens surfaces of a designated lens element.

2. An optical system according to claim 1, wherein said first lens element is located closer to an object to be photographed said second lens element.

3. The optical system of claim 1, wherein all aspheric lens surfaces of said first and said second lens elements satisfy the following relationship at a high magnification:

$|SP| \leq 0.2$, wherein SP designates a power variation of said aspheric lens surface within an effective radius of an associated lens element from the optical axis of said aspheric lens surface, to an outer peripheral edge of a flux of rays which pass through said aspheric lens surface, said power variation being defined by a difference between a maximum power within the effective radius of the aspheric lens surface, and a minimum power within the effective radius of the aspheric lens surface.

4. The optical system of claim 3, wherein power variations of said aspheric lens surfaces of said first and said second lens elements are designated as SP1, SP2, SP3, and SP4, respectively, and satisfy the following relationships:

$|SP1| \leq 0.1$ $|SP2| \leq 0.2$ $|SP3| \leq 0.04$ $|SP4| \leq 0.06$.

* * * * *